United States Patent
Tsuchiya et al.

(10) Patent No.: US 12,445,742 B2
(45) Date of Patent: Oct. 14, 2025

(54) MOVABLE APPARATUS, IMAGE PROCESSING APPARATUS, STORAGE MEDIUM, AND INSTALLATION METHOD FOR IMAGING APPARATUS

(71) Applicant: CANON KABUSHIKI KAISHA, Tokyo (JP)

(72) Inventors: Tomoaki Tsuchiya, Kanagawa (JP); Hironobu Hoshino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 18/599,295

(22) Filed: Mar. 8, 2024

(65) Prior Publication Data
US 2024/0314455 A1 Sep. 19, 2024

(30) Foreign Application Priority Data
Mar. 17, 2023 (JP) .................. 2023-042522

(51) Int. Cl.
*H04N 23/90* (2023.01)
*H04N 5/265* (2006.01)
*B60R 1/22* (2022.01)

(52) U.S. Cl.
CPC ............. *H04N 23/90* (2023.01); *H04N 5/265* (2013.01); *B60R 1/22* (2022.01); *B60R 2300/607* (2013.01)

(58) Field of Classification Search
CPC ...... H04N 23/698; H04N 23/90; H04N 7/181; H04N 5/265; H04N 23/57; H04N 7/18;
(Continued)

(56) References Cited

U.S. PATENT DOCUMENTS

| 6,476,855 B1 | 11/2002 | Yamamoto |
| 2005/0083427 A1 | 4/2005 | Imoto |

(Continued)

FOREIGN PATENT DOCUMENTS

| EP | 3451651 A | 3/2019 |
| JP | 2008-283527 A | 11/2008 |

(Continued)

OTHER PUBLICATIONS

Herbert Gross, et al.: "Handbook of Optical Systems, vol. 4: Survey of Optical Instruments" In: "Handbook of Optical Systems", Jan. 1, 2008, Wiley-VCH, Weinheim, DE, XP055237921, ISBN: 978-3-527-40380-6, pp. 338-346.

*Primary Examiner* — Masum Billah
(74) *Attorney, Agent, or Firm* — Cowan, Liebowitz & Latman, P.C.

(57) ABSTRACT

In a movable apparatus, a first imaging apparatus and a second imaging apparatus provided with an optical system for forming an optical image having a low resolution region in the vicinity of an optical axis and a high resolution region outside the low resolution region on a light receiving surface of an imaging element are used, the first imaging apparatus is installed at a first installation position in a front corner portion of the movable apparatus so that the ground in front of the movable apparatus and the ground in a first side of the movable apparatus are imaged, and the second imaging apparatus is installed at a second installation position at a rear corner portion of the movable apparatus, which is on a diagonal corner side of the first imaging apparatus so that the ground in the rear of the movable apparatus and the ground in a second side of the movable apparatus are imaged.

15 Claims, 16 Drawing Sheets

(58) Field of Classification Search
CPC ........ H04N 23/55; H04N 23/60; H04N 23/69; H04N 5/2628; B60R 2300/607; B60R 1/27; B60R 11/04; B60R 2300/105; B60R 2300/802; B60R 2300/70; B60R 1/28; B60R 2300/806; B60R 2300/20; B60R 2300/303
USPC ......................................................... 348/148
See application file for complete search history.

(56) References Cited

U.S. PATENT DOCUMENTS

2014/0002660 A1    1/2014  Takahashi
2023/0098424 A1*   3/2023  Mori ..................... H04N 23/70
                                                   382/103

FOREIGN PATENT DOCUMENTS

JP    2012023658  A  *  2/2012
WO   2023276819  A1    1/2023

* cited by examiner

MOVABLE APPARATUS, IMAGE PROCESSING APPARATUS, STORAGE MEDIUM, AND INSTALLATION METHOD FOR IMAGING APPARATUS

BACKGROUND OF THE INVENTION

Field of the Invention

The present invention relates to a movable apparatus, for example, an automobile and the like, an image processing apparatus, a storage medium, an installation method for an imaging apparatus, and the like.

Description of the Related Art

In recent years, a camera monitor system (CMS) technology for replacing a mirror mounted on an automobile with an electronic mirror has been promoted.

There is a case in which a plurality of imaging apparatuses installed for the CMS are installed so that images in all directions can be captured as eyes of an electronic system for confirming safety. In order to confirm safety around a vehicle, it is required to install cameras in four directions of front, back, left, and right from the vehicle, and combines the video images of the four cameras to generate and display bird's-eye video image as if the vehicle is viewed from a virtual viewpoint in the sky. In Japanese Patent Application Laid-Open No. 2008-283527, a technology of capturing an image of the periphery of the vehicle and displaying a bird's-eye view video image is described.

However, the technology disclosed in Japanese Patent Application Laid-Open No. 2008-283527 requires at least four cameras to be mounted on the vehicle so that a bird's-eye video image is captured, and there is the problem that this imposes a load on electric power and system control.

SUMMARY OF THE INVENTION

In a movable apparatus that is one aspect of the present invention, a first imaging apparatus and a second imaging apparatus provided with an optical system for forming an optical image having a low resolution region in the vicinity of an optical axis and a high resolution region outside the low resolution region on a light receiving surface of an imaging element are used, the first imaging apparatus is installed at a first installation position at a front corner portion of the movable apparatus so that the ground in front of the movable apparatus and the ground in a first side of the movable apparatus are imaged, and the second imaging apparatus is installed at a second installation position at a rear corner portion of the movable apparatus, which is on a diagonal corner side of the first imaging apparatus so that the ground in the rear of the movable apparatus and the ground in a second side of the movable apparatus are imaged.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

First Embodiment

In the first embodiment, an installation method for creating video image (bird's-eye video image) in which a vehicle serving as a movable apparatus is looked down on from a virtual viewpoint that is present above the vehicle by using two camera units will be explained. That is, in the first embodiment, an installation method for an imaging apparatus, and a vehicle serving as a movable apparatus having the imaging apparatus installed in this way will be explained.

Figure 1:
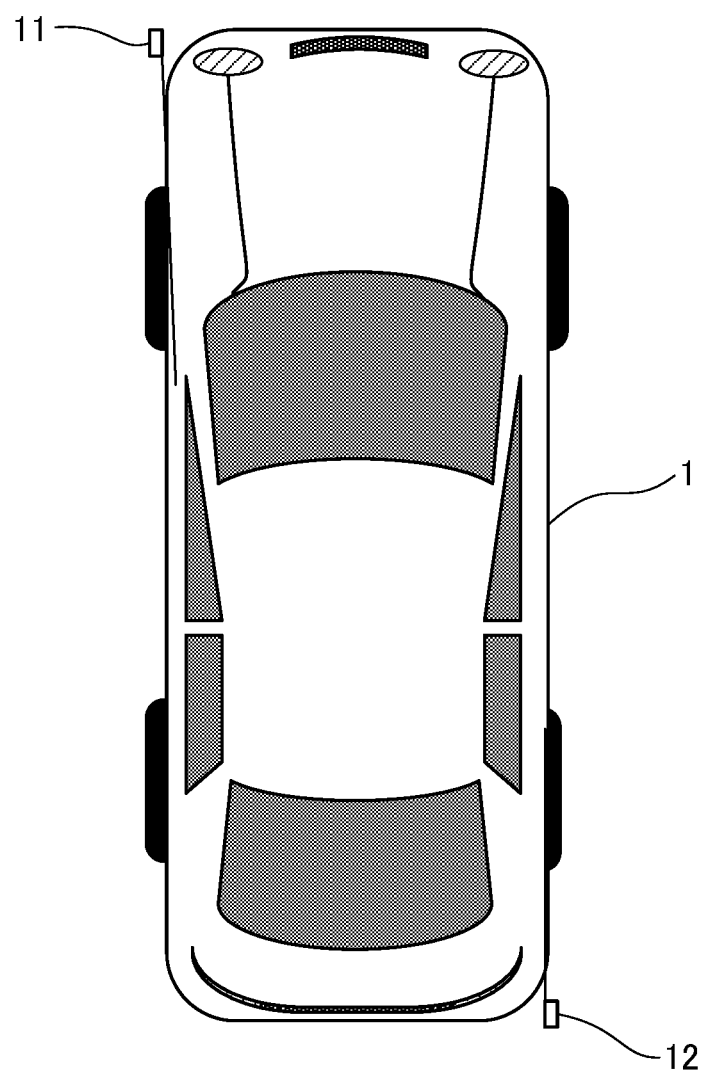
FIG. 1 is a diagram that explains a positional relation between a camera unit and a vehicle according to the first embodiment.

FIG. 1 is a diagram that explains a positional relation between a camera unit and a vehicle according to the first embodiment. As shown in FIG. 1, for example, the camera unit 11 (first imaging apparatus) serving as a first imaging apparatus is installed at the left front corner of the vehicle 1, which is, for example, an automobile, and the camera unit 12 (second imaging apparatus) is installed at the right rear corner of the vehicle 1.

The camera unit 11 is installed so that video images at the lower front and lower left side of the vehicle 1 can be imaged in order to capture a video image for a bird's-eye video image. The camera unit 12 is installed so that video images at the lower rear side and the lower right side of the vehicle 1 can be captured in order to capture a video image for a bird's-eye video image.

That is, in the first embodiment, the first imaging apparatus is installed at a front corner of the movable apparatus so that the ground in front of the movable apparatus and the ground on the first side of the movable apparatus are imaged. Additionally, the second imaging apparatus is installed at a rear corner of the movable apparatus, on a diagonal corner side of the first imaging apparatus, so that the ground in the rear of the movable apparatus and the ground on the second side of the movable apparatus are imaged. Additionally, in the first embodiment, it is assumed that the first side is the passenger seat side of the movable apparatus.

Although, in the first embodiment, the camera units being installed at the front left corner and the rear right corner of the vehicle 1 is explained, they may be installed at the front right corner and the rear left corner of the vehicle 1. Additionally, the number of camera units may be at least two.

Note that each of the camera units 11 and 12 in the present embodiment has an optical system and an imaging element for capturing an image that has been formed by an optical system. Additionally, the optical system of each of the camera units 11 and 12 generates an image circle having a characteristic in which the resolution at the peripheral angle of view is higher than the resolution at the center in the optical axis direction and forms an image on the imaging element.

That is, the optical systems of the camera units 11 and 12 of the present embodiment have optical characteristics of forming an optical image having a low resolution region in the vicinity of the optical axis and a high resolution region outside the low resolution region on the light receiving surface of the imaging element.

Figures 2A, 2B:
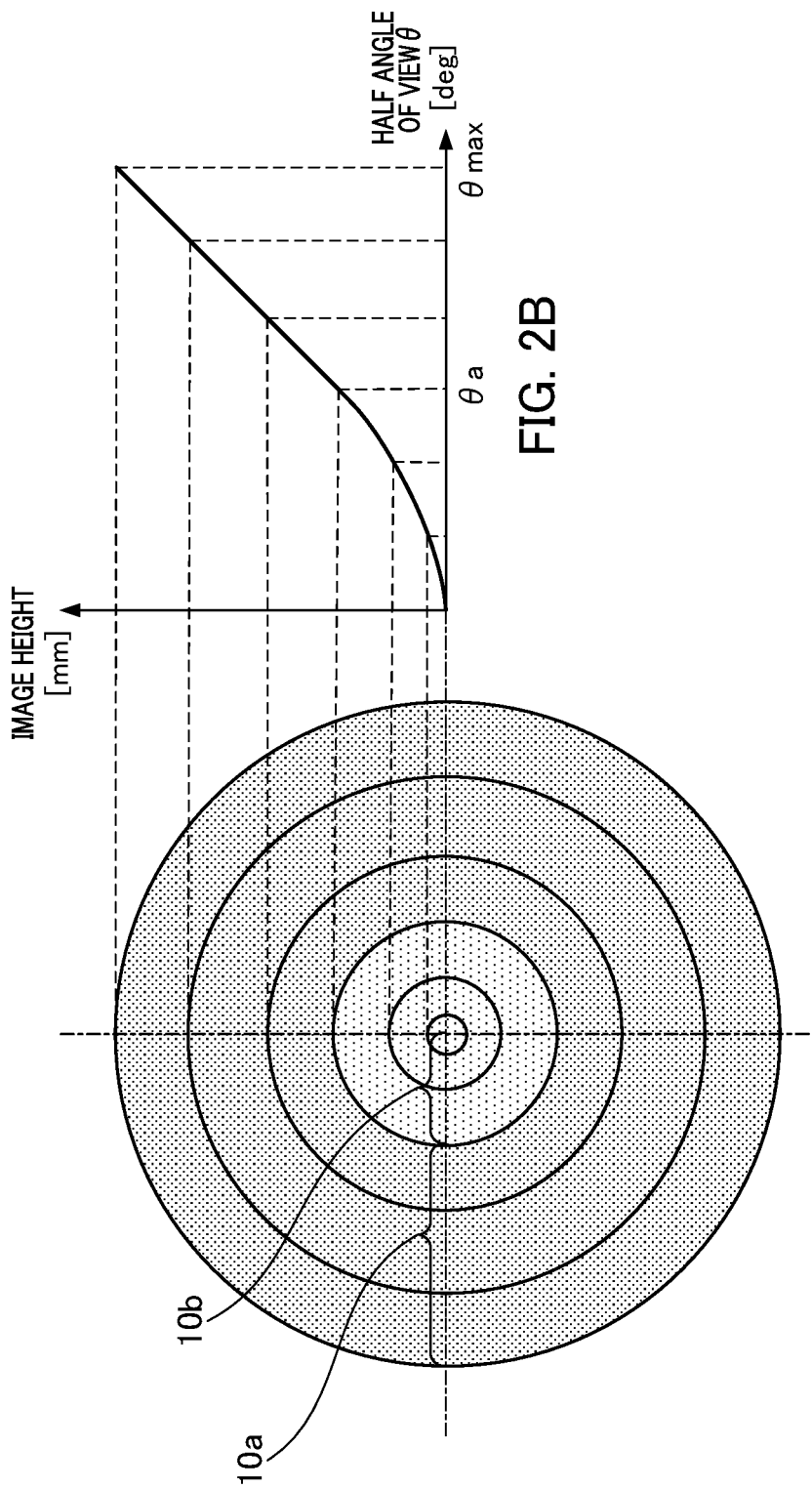
FIGS. 2A and 2B are diagrams for explaining optical characteristics of a camera unit 11 according to the first embodiment.

FIGS. 2A and 2B are diagrams for explaining optical characteristics of the optical system of the camera unit 11 according to the present embodiment. Note that, In the present embodiment, it is assumed that the optical characteristics of the optical systems of the camera units 11 and 12 have substantially the same characteristics, and the optical characteristics of the optical system of the camera unit 11 will be explained as an example with reference to FIG. 2.

FIG. 2A is a diagram showing an image circle of the optical system of the camera unit 11 and an image height y at each half angle of view (an angle formed by an optical axis and an incident light beam) on the light receiving surface of the imaging element in a contour form.

FIG. 2B is a diagram illustrating projection characteristics of an image circle representing a relation between the image height y and the half angle of view θ of the optical system of the camera unit 11. In FIG. 2B, the horizontal axis represents the half angle of view θ, and the vertical axis represents the imaging height (image height) y on the light receiving surface (image surface) of the imaging element of the camera unit 11.

As shown in FIG. 2B, the optical system of the camera unit in the present embodiment is configured such that the projection characteristic y (θ) is different between a region (central region) smaller than a predetermined half angle of view θa and a region (peripheral region) equal to or larger than the half angle of view θa.

When an increase amount of the image height y with respect to the half angle of view θ per unit, that is, an index represented by a differential value dy (θ)/d θ at the half angle of view θ in the projection characteristic y (θ) is set as the resolution, it can be said that the resolution is higher as the inclination of the projection characteristic y (θ) in FIG. 2B is larger. That is, the optical system shown in FIG. 2 has projection characteristics in which the image height with respect to the angle of view per unit is higher in the angle of view of the high-resolution region than in the angle of view of the low-resolution region near the optical axis.

Additionally, it can also be said that the resolution is higher as the interval of the image height y in each half angle of view of the contour line in FIG. 2A is larger. Thus, the optical system of the camera unit 11 has optical characteristics in which the resolution in a region where the half angle of view is equal to or larger than θa is higher than in a region where the half angle of view is smaller than θa.

Note that it is assumed that the projection characteristic y (θ) of the optical system of the camera unit of the present embodiment satisfies, for example, the condition of Formula 1 below.

$$0.2 < 2*f\tan(\theta\max/2)/y(\theta\max) < 0.92 \qquad \text{(Formula 1)}$$

In the present embodiment, a region (peripheral region) of the peripheral portion of the light receiving surface having a half angle of view θ greater than θ a is referred to as a high resolution region 10a, and a central region (central region) of the light receiving surface having a half angle of view θ of less than θa is referred to as a low resolution region 10b.

That is, the optical system of the present embodiment has projection characteristics in which the image height with respect to the angle of view per unit is higher in the angle of view of the high resolution region in comparison to the angle of view of the low resolution region in the vicinity of the optical axis, has the low resolution region in the vicinity of the optical axis, and has the high resolution region outside the low resolution region.

Note that, in the present embodiment, a circle of a boundary between the high-resolution region 10a and the low-resolution region 10b is referred to as a resolution boundary, and a boundary image on the display screen corresponding to the resolution boundary is referred to as a display resolution boundary or simply referred to as a boundary image. However, the boundary between the high-resolution region 10a and the low-resolution region 10b is not limited to a circular shape, and may be an ellipse in which the projection characteristics y (θ) are different for each radial direction, or may be a distorted shape.

Additionally, for example, the centroid of the light-receiving surface of the image capturing element and the centroid of the high-resolution region 10a or the low-resolution region 10b may be shifted from each other in a predetermined direction. Additionally, the centroid of the high-resolution region 10a or the low-resolution region 10b may be shifted from the position at which the optical axis of the optical system intersects with the light-receiving surface.

Figure 3:
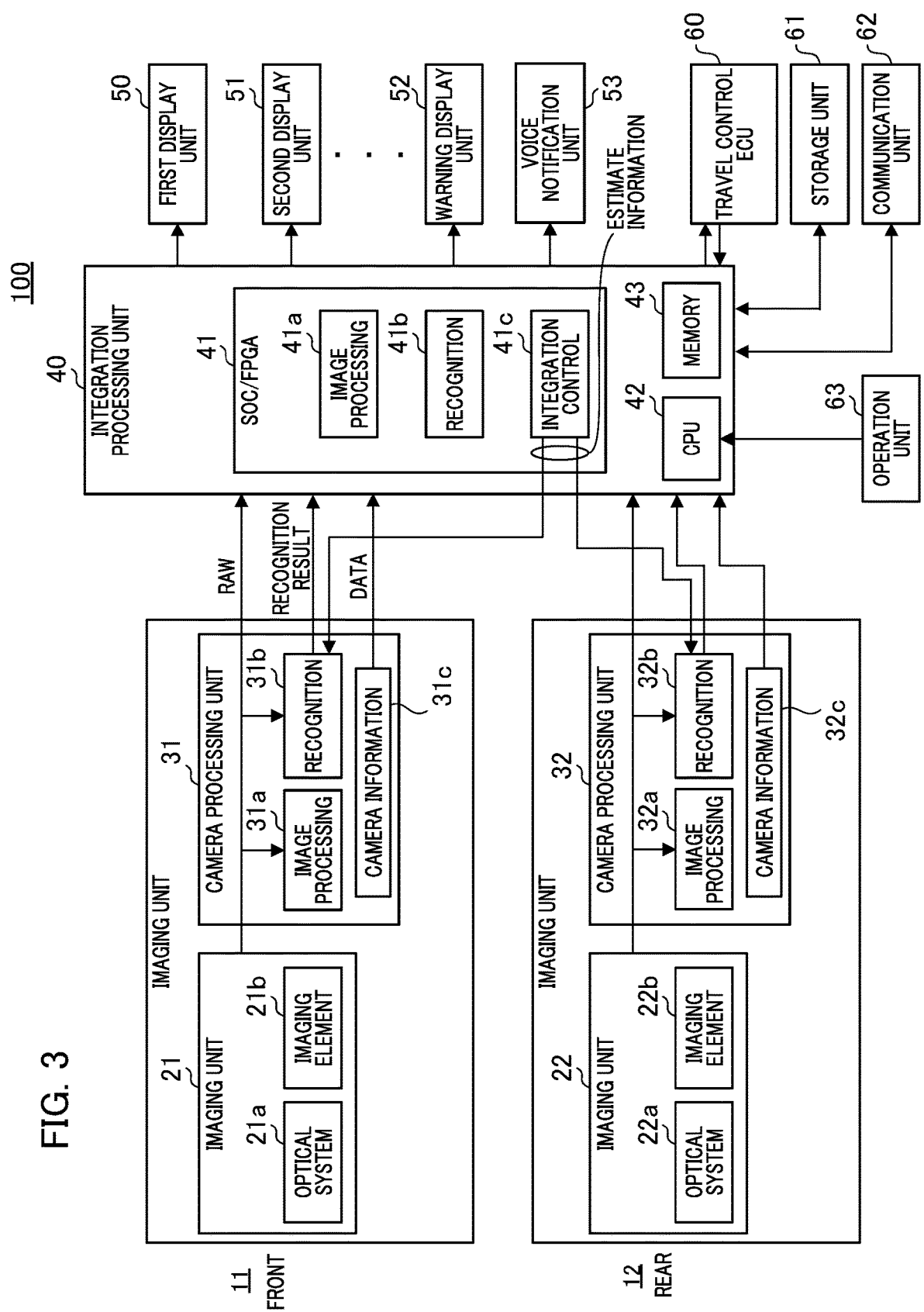
FIG. 3 is a functional block diagram showing a configuration example of an image processing system 100 according to the first embodiment.

Next, a configuration of the image processing system according to the present embodiment will be explained with reference to FIG. 3. FIG. 3 is a functional block diagram illustrating a configuration example of the image processing system 100 according to the first embodiment, and it is assumed that the image processing system 100 of FIG. 3 is mounted on the vehicle 1. However, a part of the image processing system 100 and the like may be provided at a location that is different from the vehicle 1.

Note that some of the functional blocks shown in FIG. 3 are realized by causing a CPU and the like serving as a computer (not illustrated) included in the image processing system to execute a computer program stored in a memory serving as a storage media (not illustrated).

However, some or all of them may be realized by hardware. As the hardware, a dedicated circuit (ASIC), a processor (reconfigurable processor, DSP), and the like can be used. Additionally, each of functional blocks shown in FIG. 3 may not necessarily be incorporated in the same housing, and may be configured by separate devices that are connected to each other via a signal path.

The camera unit 11 consists of an imaging unit 21 and a camera processing unit 31, and the camera unit 12 consists of an imaging unit 22 and a camera processing unit 32. The imaging unit 21 consists of an optical system 21a and an imaging element 21b such as an CMOS image sensor, and the imaging unit 22 consists of an optical system 22a and an imaging element 22b such as an CMOS image sensor.

Each of the optical systems 21a and 22a of the camera units 11 and 12 is configured by one or more optical lenses and has optical characteristics as shown in FIGS. 2A and 2B. In addition, the optical systems 21a and 22a respectively form (image) optical images on the light receiving surfaces of the imaging elements 21b and 22b.

The imaging elements 21b and 22b function as an imaging unit, and photoelectrically convert a formed optical image to output an imaging signal. Note that, on the light receiving surfaces of the imaging elements 21b and 22b, for example, color filters of R, G, and B are arranged for each pixel in a Bayer array, and pixel signals of R, G, and B are sequentially output as imaging signals from the imaging unit 22.

The camera processing units 31 and 32 have functions of processing imaging signals that have been output from the imaging units 21 and 22. The camera processing unit 31 includes an image processing unit 31a, a recognition unit 31b, and a camera information unit 31c, and the camera processing unit 32 includes an image processing unit 32a, a recognition unit 32b, and a camera information unit 32c.

In the camera processing units 31 and 32, a CPU serving as a computer and a memory serving as storage media that stores a computer program are incorporated, and the CPU executes the computer program in the memory. Accordingly, a configuration in which processing in the camera processing units 31 and 32 is executed is provided.

Note that the camera processing units 31 and 32 are not limited to the configuration as described above, and the image processing units 31a and 32a and the recognition units 31b and 32b may be configured by hardware such as a dedicated circuit (ASIC) and a processor (reconfigurable processor, DSP).

The image processing units 31a and 32a perform various kinds of image correction processing, such as white balance adjustment, gain/offset adjustment, gamma processing, color matrix processing, lossless compression processing, and distortion correction processing, on the imaging signals that have been output from the imaging units 21 and 22.

Alternatively, for example, the image processing units 31a and 32a may perform de-Bayer processing on the image data that have been input from the imaging units 21 and 22 according to the Bayer array, and convert the image data into RGB raster format image data. Note that a part of the image processing as described above may be performed by other blocks of the image processing system 100 other than the image processing units 31a and 32a.

The recognition units 31b and 32b have functions of performing image recognition on predetermined objects (for example, an automobile, a person, an obstacle, and the like) from the image signals subjected to the image processing by the image processing units 31a and 32a, and outputting first image recognition results to an integration processing unit 40.

The camera information units 31c and 32c function as holding units that hold camera information such as characteristic information related to characteristics of an optical image and position and orientation information of the camera units, and respectively hold camera information of the camera units 11 and 12 in a memory in advance. Additionally, the camera information units 31c and 32c may hold information from various sensors that are provided in the camera units 11 and 12.

The held camera information includes, for example, characteristic information of the optical systems 21a and 22a, number of pixels of the imaging elements 21b and 22b, mounting position information and orientation (pitch, roll, yaw, and the like) of the camera units 11 and 12 in the vehicle coordinate system, an optical axis direction, an imaging range, and the like.

Additionally, the camera information may include information such as a gamma characteristic, a sensitivity characteristic, a frame rate, an image format of the video image, optical characteristics of the optical system 21a and 22a, and number of pixels of the imaging elements 21b and 22b output from the camera processing unit 31. Additionally, the camera information may include information such as a photoelectric conversion characteristic, coordinates of a mounting position of the camera unit in vehicle coordinates, and orientation information.

Since the mounting position on the vehicle for each camera unit is often determined, the camera unit mounting position information, which serves as a coordinate relative to the vehicle 1, is stored in a memory in the camera information unit in advance.

Additionally, the camera information may be information unique to the imaging units 21 and 22 (for example, aberration characteristics of a lens, noise characteristics of an imaging element, and the like). The camera information is transmitted to the integration processing unit 40, and is referred to when image processing and the like necessary for display on the display unit is performed in the integration processing unit 40.

The integration processing unit 40 has functions of displaying the video signals that have been received from the camera units 11 and 12 on the display devices such as a first display unit 50 and a second display unit 51, and notifying a warning display unit 52 and a voice notification unit 53. Furthermore, the integration processing unit 40 further has, for example, an image recognition function of an object crossing the boundary of the imaging range of the camera units 11 and 12.

The integration processing unit 40 includes an SOC (System On Chip)/FPGA (Field Programmable Gate Array)

41, a CPU 42 serving as a computer, and a memory 43 serving as a storage media. Note that the integration processing unit 40 of the present embodiment is explained as being housed in a housing that is different from the camera unit.

Note that some or all of the functional blocks included in the integration processing unit 40 and the like may be realized by hardware, or may be realized by the CPU 42. As the hardware, a dedicated circuit (ASIC), a processor (reconfigurable processor, DSP), and the like can be used. The CPU 42 performs various kinds of control of the entire image processing system 100 by executing a computer program stored in the memory 43.

The SOC/FPGA 41 has an image processing unit 41a, a recognition unit 41b, and an integration control unit 41c. The image processing unit 41a has a function of performing image processing such as resolution conversion for display on the display device based on the image signals and the camera information that have been acquired from the camera processing units 31 and 32.

For example, the image processing unit 41a forms the entire image of each of the imaging units 21 and 22 by combining the image signal of the low-resolution region 10b and the image signal of the high-resolution region 10a of each of the imaging units 21 and 22 for which distortion correction has been performed so as to be smoothly connected to each other. Additionally, the image processing unit 41a performs image processing such as rotation of the image based on, in particular, the arrangement position and the orientation information of the camera in the camera information, and transmits the image signal to the display device.

Additionally, the image processing unit 41a connects the images from the imaging units 21 and 22, cuts out each of the connected images, synthesizes a bird's-eye view video in which the car is looked down from a virtual viewpoint above the car, and transmits the synthesized image to the display device as an image signal.

Note that, as described above, the image processing unit 41a may realize the function of the image processing unit 41a by a CPU 42 executing the computer program stored in the memory 43. Additionally, the image processing unit may be controlled by a computer.

Figure 4:
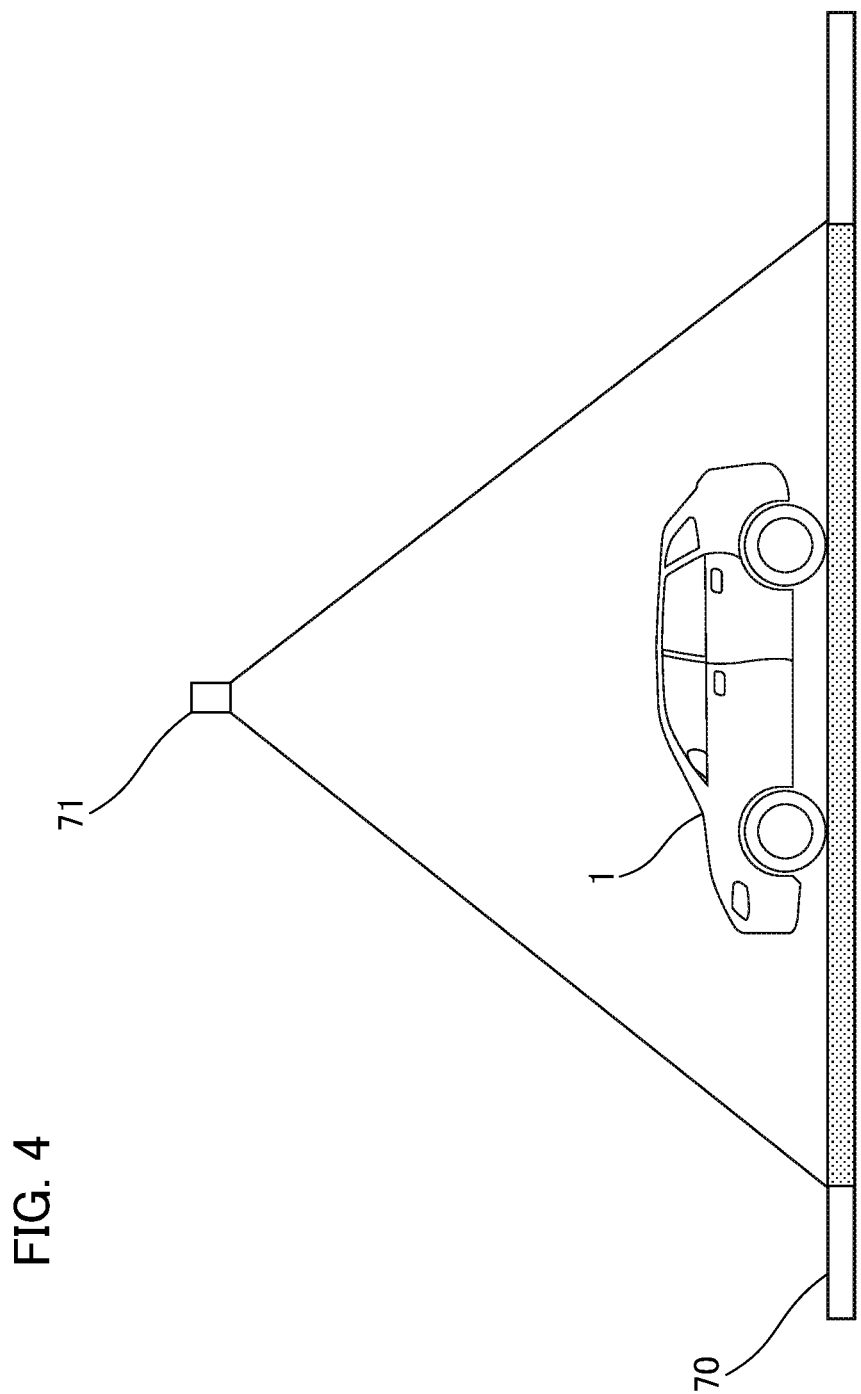
FIG. 4 is a diagram for explaining a relation between a virtual viewpoint 71 and a vehicle 1 according to the first embodiment.

The virtual viewpoint will be explained with reference to FIG. 4. FIG. 4 is a diagram for explaining a relation between the virtual viewpoint 71 and the vehicle 1 according to the first embodiment, and illustrates an example in which the vehicle 1 is traveling on a road surface 70.

The coordinate conversion (deformation) of the image acquired by the camera unit 11 and the camera unit 12 is performed by an image processing part 41a as if the road surface 70 is imaged on the assumption that the virtual imaging device is located at the virtual viewpoint 71 directly above the vehicle. That is, a coordinate conversion of the image is performed to generate a virtual viewpoint image from a virtual viewpoint.

At this time, the image processing unit 41a deforms the image that has been acquired from the camera unit 11 and the camera unit 12 based on the calibration data stored in a storage unit 61. Note that the image may be deformed based on various parameters such as a coordinate conversion table based on the calibration data.

The contents of the calibration data include internal parameters of the camera due to the lens distortion amount of each camera and the deviation from the sensor position, and external parameters representing the relative positional relation between each of the cameras and the vehicle.

Note that it is assumed that calibration data are calculated by performing calibration of the camera in advance. Additionally, in a case in which the virtual camera is an orthographic projection camera, it is possible to generate an image in which a sense of distance can be easily grasped without distortion.

Additionally, the projection plane of the bird's-eye view may not be a plane that replicates a road surface, and may be, for example, a bowl-shaped three-dimensional shape (curved surface). Additionally, the position of the virtual viewpoint may not necessarily be directly above the vehicle, and may be, for example, a viewpoint position in which the peripheral region is viewed from the diagonally front direction or diagonally rear direction of the vehicle or from the inside of the vehicle.

The recognition unit 41b performs image recognition processing on a combined image obtained by connecting the images from the imaging units 21 and 22. In addition, it performs image recognition on a predetermined object (for example, an automobile, a person, an obstacle, and the like) in the combined image obtained by connecting the images from the imaging units 21 and 22 to generate a second image recognition result.

Note that the integration control unit 41c also has the function of forming a video image signal for displaying a desired image on the first display unit 50 and the second display unit 51 from the entire image of each of the imaging units 21 and 22 for which image processing has been performed. Additionally, a frame for emphatically displaying the recognized object, information on the type, size, position, speed, and the like of the object, CG for warning, and the like are generated.

Furthermore, CGs for a boundary image for displaying the boundary may be generated based on characteristic information of the optical system, such as display-resolution boundary information that has been acquired from the camera information units 31c and 32c. Then, display processing for superimposing these CGs and characters on the image is performed. The first display unit 50 and the second display unit 51 display the image signal and the integrated image recognition result.

Additionally, the integration control unit 41c communicates with a travel control unit (ECU) 60 and the like via a communication unit (not illustrated) that is provided therein using protocols such as CAN, FlexRay, or Ethernet.

Thereby, display processing is performed to appropriately change information to be displayed based on a vehicle control signal that has been received from the travel control unit (ECU) 60 and the like. For example, the range of an image to be displayed on the display unit and the like can be changed according to the moving state of the vehicle that has been acquired by the vehicle control signal.

The travel control unit (ECU) 60 is a unit that is mounted on the vehicle 1, and has a computer and a memory built therein for performing drive control and direction control of the vehicle 1 in a comprehensive manner. Information on the traveling (moving state) of the vehicle such as the traveling speed, the traveling direction, the shift lever, the shift gear, the state of the blinker, the direction of the vehicle according to the geomagnetic sensor, and GPS information and the like serving as vehicle control signals is input from the traveling control unit (ECU) 60 to the integrated processing unit 40.

Additionally, the integration control unit 41c may have a function of transmitting information such as a type, a position, a moving direction, and a moving speed of a predetermined target object (for example, an obstacle) recognized by the recognition unit 41b to the travel control unit (ECU) 60. The travel control unit (ECU) 60 thereby performs control necessary for the vehicle to avoid obstacles, such as stopping, driving, and changing the travel direction. Note that the travel control unit (ECU) 60 functions as a movement control unit that controls the movement of the vehicle based on the integrated image recognition result.

The first display unit 50 is, for example, a display device that is installed in the vicinity of the center in the vehicle width direction on the upper front portion of the driver's seat of the vehicle 1 with a display screen facing the rear of the vehicle, and functions as an electronic rear-view mirror. The first display unit 50 may be configured to be used as a mirror when not used as a display, by using a half mirror and the like.

Additionally, the first display unit 50 may be configured to include a touch panel and an operation button, acquire an instruction from the user, and output the instruction to the integration control unit 41*c*. Additionally, instead of a conventional optical side mirror, the first display unit 50 may be used as, for example, an electronic side mirror for confirming right and left obstacles and the like and a display device for displaying a video image for a front cross traffic alert (CTA). The first display unit 50 receives and displays the video signal for the first display unit with a predetermined angle of view that has been generated by the integrated control unit 41*c*.

The second display unit 51 is a display device that is installed, for example, around an operation panel near the center in the vehicle width direction at the front of the driver's seat of the vehicle 1, and functions, for example, as a display device for displaying the downward direction in front of the vehicle. The second display unit 51 also functions as a display device for displaying a necessary imaging region generated according to the intended use, similarly to the first display unit 50. The integrated control unit 41*c* receives a signal of a predetermined angle of view necessary for display for the second display unit, and displays the signal.

Additionally, for example, information based on various control signals from a navigation system, an audio system, and a travel control unit (ECU) 60 can also be displayed on the second display unit 51. Additionally, a configuration in which a touch panel and an operation button are provided, and an instruction from a user can be acquired may be provided.

Additionally, the second display unit 51 may be, for example, a display unit of a tablet computer, and can perform display by being connected to the integration processing unit 40 in a wired manner, or can wirelessly receive and display an image via a communication unit 62. Note that a liquid crystal display and an organic EL display and the like can be used as the display elements of the first display unit 50 and the second display unit 51, and the number of display units is not limited to two.

The integrated control unit 41*c* determines whether or not a moving object is included in the image based on the recognition results output by the recognition units 31*b* and 32*b* and the recognition unit 41*b*, and outputs the recognition result. The moving object here is, for example, a bicycle, a pedestrian, and another vehicle, and is referred to as a detection target in the present embodiment. The recognition result output by the integration control unit 41*c* includes the presence or absence of a detection target, the type and coordinates of the detection target, and speed information.

The warning display unit 52 issues, for example, a side collision warning to the driver by visual information based on the recognition result that has been output from the integration control unit 41*c*. The warning display unit 52 may be configured by, for example, an LED, and may be configured to perform lighting or blinking in a case in which information indicating that the detection target is present is included in the recognition result.

Additionally, the warning display unit 52 may be configured by a display, for example, a liquid crystal display. In the case in which information indicating that the detection target exists is included in the recognition result, an icon, a text information, and the like are output on the display.

Additionally, the warning display unit 52 can be installed, for example, near an end in the vehicle width, in front of the driver's seat of the vehicle 1, such that the display screen is oriented in the driver direction. Additionally, a configuration in which the warning display unit 52 is installed, for example, in the vicinity of the first display unit 50 and the second display unit 51 or also used by the first display unit 50 and the second display unit 51 may be used.

The voice notification unit 53 outputs a sound based on the recognition result that has been output from the integration control unit 41*c*. For example, the driver can be notified by outputting a sound using a speaker. The voice notification unit 53 is desirably installed, for example, near an end in the vehicle width direction, in front of the driver's seat of the vehicle 1.

Additionally, the integration control unit 41*c* also functions as a warning condition determination unit, and performs control to change the content of the warning output by the warning display unit 52 or the voice notification unit 53 based on the coordinates and speed of the detection target obtained by the recognition units 31*b* to 32*b* and the recognition unit 41*b*.

Additionally, the integrated control unit 41*c* may be configured to control the warning display unit 52 so as to increase the degree of warning as the distance to the detection target is shorter. For example, it is desirable to control the voice notification unit 53 so as to increase the volume or frequency of notification as the distance between the detection target and the side of the vehicle is shorter.

Note that the integration control unit 41*c* may be configured to determine whether or not the traveling speed of the own vehicle that has been input from the traveling control unit (ECU) 60 is equal to or less than a predetermined value, and perform the warning display on the warning display unit 52 or the warning notification on the voice notification unit 53 only when the traveling speed is equal to or less than the predetermined value.

In a case in which the traveling speed of the own vehicle is high, there is a possibility that the detection target cannot be correctly recognized, and therefore, by adopting the configuration as described above, it is possible to improve the possibility that the side detection can be correctly performed. Additionally, in a case in which the warning display or the warning notification is performed at a speed equal to or lower than the predetermined speed, it is desirable that the traveling speed of the own vehicle is, for example, 30 km/h.

Additionally, when the detection target is moving, the possibility of collision with the vehicle is higher than when the detection target is stationary. Therefore, the integration control unit 41*c* may be configured to determine whether or not the speed of the detection target is within a predetermined range, and to perform warning display on the warning display unit 52 or perform warning notification on the voice notification unit 53 only when it is determined that the speed of the detection target is within the predetermined range. In this case, the predetermined range of the speed of the detection target is desirably, for example, 5 km/h or more and 20 km/h or less.

Additionally, the integration control unit 41c determines whether or not the own vehicle is turning right or left or moving backward based on the movement direction information of the own vehicle that has been output from the travel control unit (ECU) 60. Then, when the vehicle is turning right or left or moving backward, the warning display unit 52 may perform a warning display or the voice notification unit 53 may perform a warning notification.

Note that, although, in the present embodiment, the integration processing unit 40 is mounted in the vehicle 1, a part of the processes of the image processing unit 41a, the recognition unit 41b, and the integration control unit 41c of the integration processing unit 40 may be performed, for example, by an external server, external terminals, and the like via a network.

Although, in this case, for example, the imaging units 21 and 22 serving as image acquiring units are mounted in the vehicle 1, it is possible to process a part of the functions of, for example, the camera processing units 31 and 32 and the integrated processing unit 40 (for example, the image processing unit 41a and the like) by an external server or an external terminal.

In this case, an external server, an external terminal, and the like function as an image processing device having the functions of the image processing unit 41a and the like. Additionally, a part or all the functions of the integration processing unit 40 may be provided in the travel control unit (ECU) 60.

The storage unit 61 records the entire image of each of the imaging units 21 and 22 generated by the integration processing unit 40. Furthermore, a predetermined frame indicating a recognized object, a character and a CG such as a warning, and an image displayed on a first display unit 50, a second display unit 51 and the like on which the CG is superimposed are recorded together with time and GPS information. The integration processing unit 40 reproduces past information recorded in the storage unit 61, and can also display it on the first display unit 50 and the second display unit 51.

The communication unit 62 can communicate with an external server and the like via a network, transmit information before being recorded in the storage unit 61, past travel history information recorded in the storage unit 61, and the like to the external server and the like, and store the information in the external server and the like.

Additionally, as described above, the image can be transmitted to an external terminal such as an external tablet terminal, and displayed on the second display unit 51 that is a display unit of the tablet terminal. Additionally, it is also possible to acquire traffic jam information and various information from an external server and the like, and display the information on the first display unit 50 and the second display unit 51 via the integrated processing unit 40.

An operation unit 63 is used to input various instructions to the image processing system by a user's operation. The operation unit includes, for example, a touch panel, an operation button, and the like.

Figure 5A:
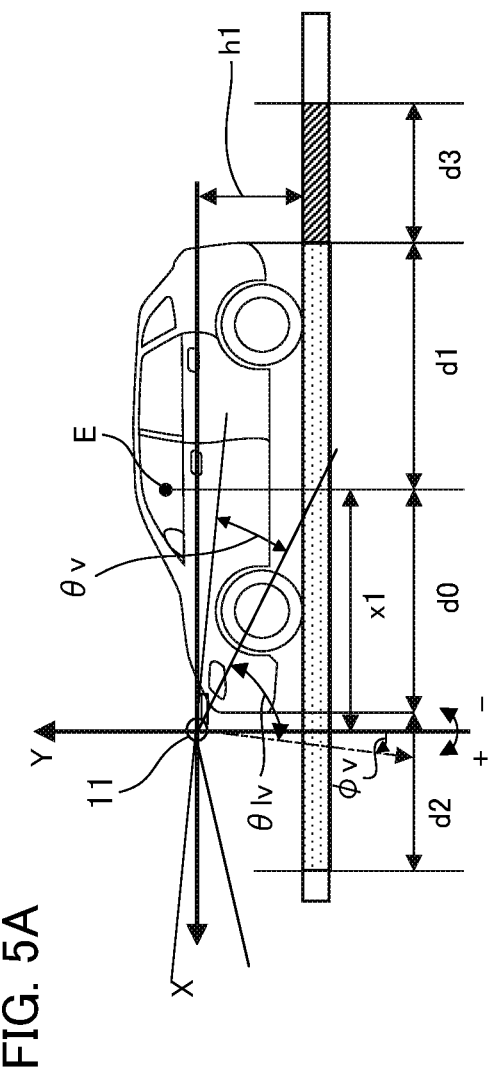
FIGS. 5A and 5B are diagrams that explain a relation between characteristics of an optical system of the camera unit 11 installed in the vehicle 1 and an imaging region necessary for displaying a bird's-eye video image according to the first embodiment.
Figure 5B:
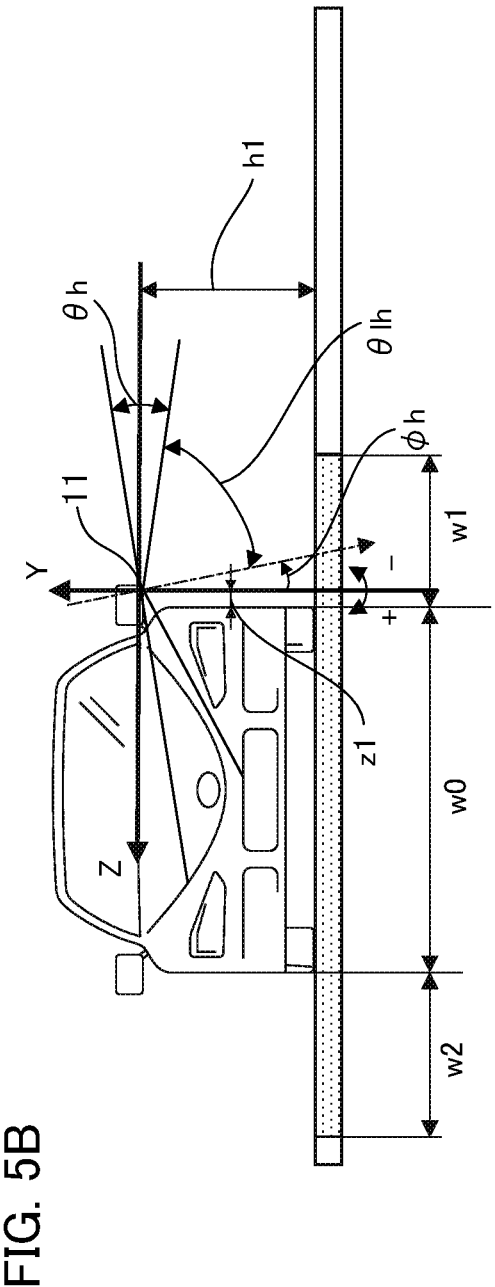

Next, the relation between the characteristics and arrangement of the camera unit 11 installed on the left front side and the camera unit 12 installed on the right rear side will be explained. FIGS. 5A and 5B are diagrams that explain the relation between the characteristics of the optical system of the camera unit 11 installed in the vehicle 1 according to the first embodiment and the imaging region necessary for displaying the bird's-eye view video image.

Figure 6A:
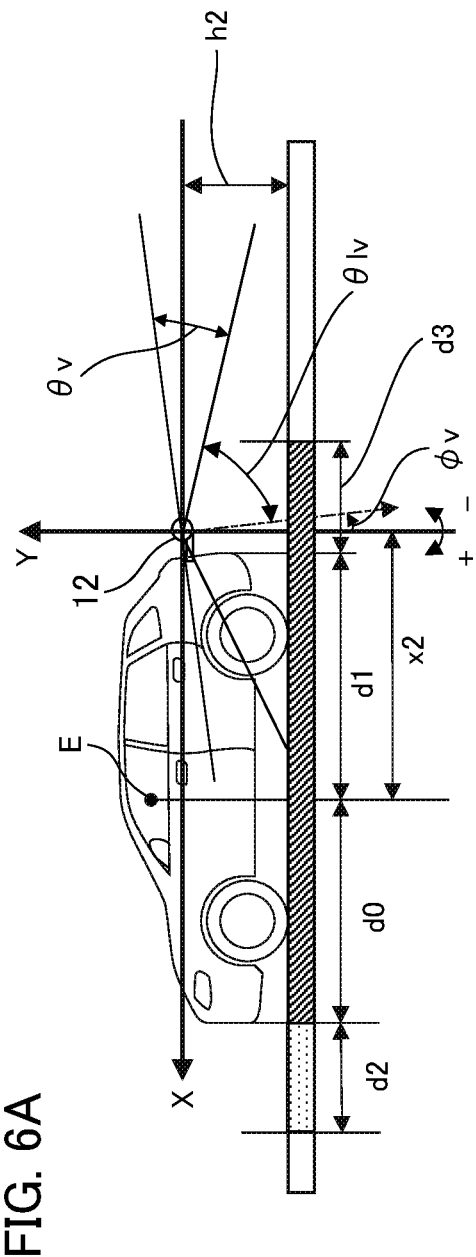
FIGS. 6A and 6B are diagrams that explain a relation between characteristics of an optical system of a camera unit 12 that is installed in the vehicle 1 and an imaging region that is necessary for displaying a bird's-eye video image according to the first embodiment.
Figure 6B:
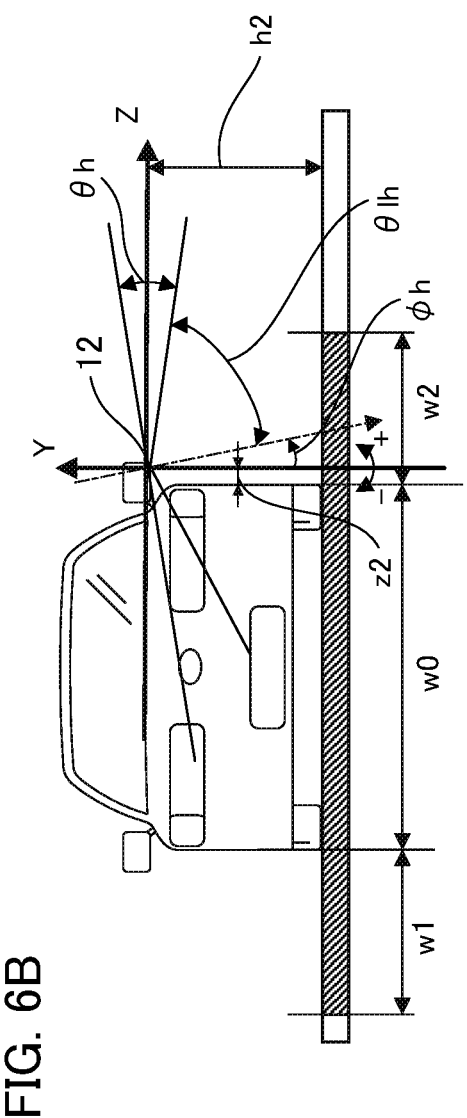

FIG. 5A is a side view of the vehicle 1 as viewed from the left side face, and FIG. 5B is a front view of the vehicle 1 as viewed from the front face. FIGS. 6A and 6B are diagrams that explain the relation between the characteristics of the optical system of the camera unit 12 installed in the vehicle 1 according to the first embodiment and the imaging region necessary for displaying the bird's-eye view video image. FIG. 6A is a side face view of the vehicle 1 as viewed from the left side face, and FIG. 6B is a front view of the vehicle as viewed from the rear face.

In FIG. 5, the installation position of the camera unit 11 is set as the origin in the X, Y, and Z directions, and the X direction is the vehicle forward direction in the horizontal direction as shown in FIG. 5A. The Z direction is a leftward horizontal direction toward the front of the vehicle 1 as shown in FIG. 5B. The Y direction is an upward direction along the vertical direction as shown in FIGS. 5A and 5B.

Note that, in the present embodiment, the horizontal direction and the vertical direction mean the horizontal direction and the vertical direction when the vehicle 1 is in a horizontal state. That is, in a case in which the vehicle 1 is in a horizontal state, the XZ plane is a horizontal plane and the Y direction is a direction along the vertical direction.

In the XY plane of FIG. 5A, a positive angle is defined in the X direction with respect to the vertical direction, and a negative angle is defined in the −X direction with respect to the vertical direction. In the YZ plane of FIG. 5B, a positive angle is defined in the Z direction with respect to the vertical direction, and a negative angle is defined in the −Z direction with respect to the vertical direction.

E in the XY plane of FIG. 5A represents the viewpoint position of the driver, and is the position of the eyes at the seating position of the driver or the center position of the seat surface for the driver. Note that in a case in which the vehicle 1 has an automatic driving function or in a case in which the movable apparatus is driven by a remote control from an external device, the viewpoint position of the driver is a central position of a seat surface of a virtual driver or a viewpoint position of the virtual driver.

The relation between the optical axis of the camera unit 11 according to the present embodiment and the imaging angle will be explained using the above definitions. $\varphi v$, $\theta v$, and $\theta lv$ on the XY plane in FIG. 5A will be explained. $\varphi v$ is the optical axis direction of the camera unit 11, and is an angle from the vertical direction.

Note that, in the present embodiment, the optical axis of the imaging apparatus is in a downward direction from the installation position ($-90° \leq \varphi v \leq +90°$). $\theta v$ is the angle of view of the high-resolution region 10a of the camera unit 11. $\theta lv$ is the angle of view of the low-resolution region 10b of the camera unit 11.

$\varphi h$, $\theta h$, and $\theta lh$ in the YZ plane of FIG. 5B will be explained. $\varphi h$ is the optical axis direction of the camera unit 11 and is an angle from the vertical direction. $\theta h$ is the angle of view of the high-resolution region 10a of the camera unit 11. $\theta lv$ is the angle of view of the low-resolution region 10b of the camera unit 11.

The positional relation of the camera unit 11 according to the present embodiment will be explained using the above definitions. x1 in the XY plane of FIG. 5A is the horizontal distance between the camera unit 11 and the viewpoint position E of the driver. h1 is the vertical distance between the camera unit 11 and the ground.

z1 in the YZ plane of FIG. 5B is a distance between the installation position of the camera unit 11 (first installation position) and the side face of the vehicle 1. That is, z1 is the distance between the movable apparatus left side face and the first installation position.

Similarly, in FIG. 6A, the installation position of the camera unit 11 is set as the origin in the X, Y, and Z directions, and the X direction is the vehicle forward direction in the horizontal direction as shown in FIG. 6A. The Z direction is a rightward horizontal direction toward the rear face of the vehicle 1 as shown in FIG. 6B. The Y direction is an upward direction along the vertical direction as shown in FIGS. 6A and 6B.

The positional relation of the camera unit 12 in the present embodiment will be explained using the above definitions. x2 in the XY plane in FIG. 6A is the horizontal distance between the camera unit 12 and the viewpoint position E of the driver. h2 is the vertical distance between the camera unit 12 and the ground. z2 in the YZ plane in FIG. 6B is the distance between the installation position of the camera unit 12 (second installation position) and the side face of the vehicle 1. That is, z2 is the distance between the right side face of the movable apparatus and the second installation position.

Figure 7:
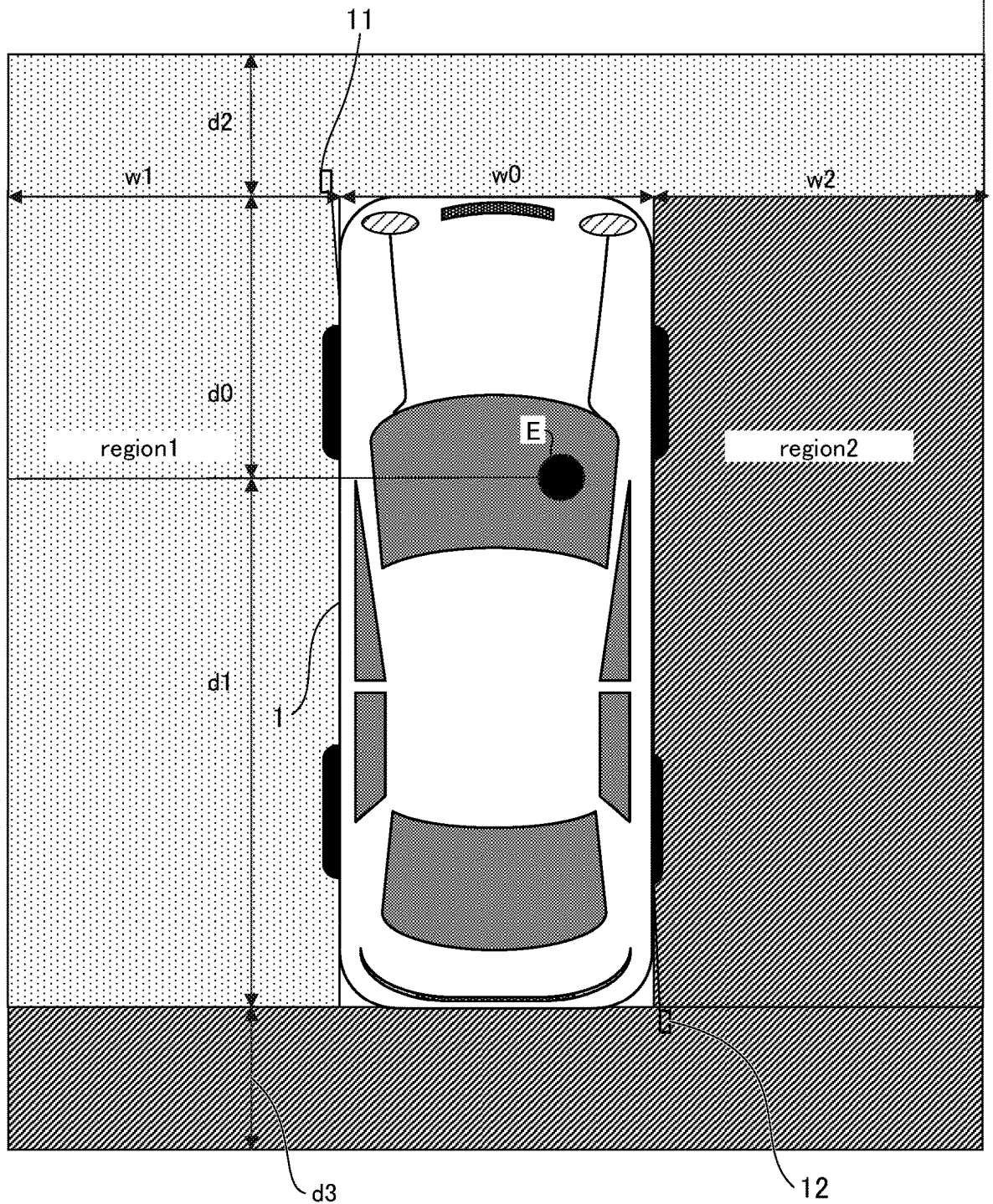
FIG. 7 is a top plan view of the vehicle 1 according to the first embodiment.

Here, a region necessary for the bird's-eye view video image (predefined region) will be explained with reference to FIG. 5, FIG. 6, and FIG. 7. FIG. 7 is a plan view of the vehicle 1 according to the first embodiment as viewed from above, and the X and Z directions correspond to those in FIG. 5 and FIG. 6. The predefined region for the bird's-eye view video image is a region on the ground as shown by hatching in FIGS. 5A and 5B, FIGS. 6A, 6B, and FIG. 7, and is a region where the driver should confirm the safety of the periphery region of the vehicle.

As shown in FIG. 7, the predefined region for the bird's-eye view video image consists of an L-shaped region, region 1, consisting of a front region and a side region of the passenger seat, and an L-shaped region, region 2, consisting of the side region of the driver seat and a rear region. The region 1 is a region of the ground surface as shown in FIG. 7, including a front region defined by a distance d2 forward from the front end of the vehicle, a vehicle width w0, a width w1 and w2 from the side face of the vehicle, and do and d1, which are distances in the X direction between the front and rear ends of the vehicle and the driver's viewpoint position E, and a width w1.

The region2 is an L-shaped region on the ground surface as shown in FIG. 7, which includes a region on the side of the driver's seat defined by the distances do and d1 and the width w2, and a rear region defined by the distance d3 and the vehicle width w0 and the widths w1 and w2.

Accordingly, in the first embodiment, the camera unit 11 is installed so as to satisfy the following formulae 2 to 5 so that the range of the region 1 within the imaging range of the camera unit 11 is included. Additionally, the camera unit 12 is installed so as to satisfy Formulae 6 to 9 below so that the range of the region2 within the imaging range of the camera unit 12 is included.

$$\varphi v - \theta v - \theta 1 v \le A \tan\left((d0 + d2 - x1)/h1\right) \le \varphi v + \theta v + \theta 1 v \quad \text{(Formula 2)}$$

$$\varphi v - \theta v - \theta 1 v \le -A \tan\left((x1 + d1)/h1\right) \le \varphi v + \theta v + \theta 1 v \quad \text{(Formula 3)}$$

$$\varphi h - \theta h - \theta 1 h \le A \tan\left((w1 + w0 + z1)/h1\right) \le \varphi h + \theta h + \theta 1 h \quad \text{(Formula 4)}$$

$$\varphi h - \theta h - \theta 1 h \le -A \tan\left((w1 - z1)/h1\right) \le \varphi h + \theta h + \theta 1 h \quad \text{(Formula 5)}$$

$$\varphi v - \theta v - \theta 1 v \le A \tan\left((d0 + x2)/h2\right) \le \varphi v + \theta v + \theta 1 v \quad \text{(Formula 6)}$$

$$\varphi v - \theta v - \theta 1 v \le -A \tan\left((d1 + d3 - x2)/h2\right) \le \varphi v + \theta v + \theta 1 v \quad \text{(Formula 7)}$$

$$\varphi h - \theta h - \theta 1 h \le A \tan\left((w2 - z2)/h2\right) \le \varphi h + \theta h + \theta 1 h \quad \text{(Formula 8)}$$

$$\varphi h - \theta h - \theta 1 h \le -A \tan\left((w1 + w0 + z2)/h2\right) \le \varphi h + \theta h + \theta 1 h \quad \text{(Formula 9)}$$

By installing the camera unit 11 so as to satisfy the above-described Formula 2 to Formula 5 and installing the camera unit 12 so as to satisfy the above-described Formula 6 to Formula 9, the combined the camera unit 11 and the camera unit 12 can capture images of the periphery of the vehicle 1 without any gap. Note that it is assumed that the installation conditions of Formula 2 to Formula 9 described above are first conditions.

Note that, in the present embodiment, the camera unit 11 is disposed at a position where the vehicle 1 is not reflected in the center of the optical axis in order to capture an image of the front face of the vehicle and side faces of the vehicle. That is, the offset x1 of the camera unit for imaging the front of the vehicle is set to be larger than the distance do from the viewpoint position E to the front end of the vehicle 1. Furthermore, the offset z1 of the camera unit 11 is installed outside the side of the car 1 (−Z direction in FIG. 5) so that the images of the side faces of the vehicle are imaged.

Similarly, in the present embodiment, the camera unit 12 is disposed at a position where the vehicle 1 is not reflected in the center of the optical axis in order to capture an image of the rear and side faces of the vehicle. That is, the offset x2 of the camera unit 12 is set to be larger than distance d1 from the viewpoint position E to the rear face end of the vehicle 1 in order to capture an image of the rear of the vehicle. Furthermore, the offset z2 of the camera unit 12 is set outside (in the Z direction in FIG. 6) the side of the vehicle 1 so that an image in the rear of the side face of the vehicle is captured.

Furthermore, in the present embodiment, the camera unit 11 and the camera unit 12 are installed so that a high resolution image in the horizontal direction can be captured for safety confirmation of the periphery region of the vehicle. The installation conditions for this will be explained.

That is, in order to detect the periphery region of the vehicle, it is desirable that an object approaching from a far side in the front-rear and left-right directions of the vehicle can be confirmed. Therefore, in the first embodiment, the camera unit 11 and the camera unit 12 are installed so that the front, rear, left, and right horizontal directions can be appropriately confirmed.

In the first embodiment, the camera unit 11 is installed so as to satisfy Formula 10 and Formula 11 below. That is, the installation is performed so as to include both the high-resolution region 10a in the left direction and in the rear side ((φh−θh−θh) to (φh−θ1h) in the right direction toward the front of the vehicle and (φv+θ1v) to (φv+θv+θ1v) in the rear of the vehicle).

$$\varphi h - \theta h - \theta 1 h \le -90° \le \varphi h - \theta 1 h \quad \text{(Formula 10)}$$

$$\varphi v + \theta 1 v \le 90° \le \varphi v + \theta v + \theta 1 v \quad \text{(Formula 11)}$$

Additionally, the camera unit 12 is also installed so as to satisfy Formula 12 and Formula 13 below. That is, the unit is installed so as to include both the high-resolution region 10a in the left direction and on the rear side ((φh+θ1h) to (φh+θh+θlh) in the right direction toward the front of the vehicle and (φv−θv−θlv) to (φv−θlv) in the rear of the vehicle).

$$\varphi h + \theta l h \leq 90° \leq \varphi h + \theta h + \theta l h \quad \text{(Formula 12)}$$

$$\varphi v - \theta v - \theta l v \leq -90° \leq \varphi v - \theta l v \quad \text{(Formula 13)}$$

It is possible to capture the periphery of the vehicle with high resolution by providing the cameras so as to satisfy the above-described Formulae 10 to 13, and thus it is possible to image an object to be detected in the periphery of the vehicle from a further distance. Note that it is assumed that the installation conditions of the above-described Formulae 10 to 13 are second conditions.

Next, the camera unit 11 and the camera unit 12 will be explained by giving actual specific values. For example, an example of an automobile in which d0=0.8 m, d1=4.0 m, and w0=1.8 m will be explained.

Additionally, in the present embodiment, it is assumed that the predefined regions for the bird's-eye view video image are d2=2 m, d3=2 m, w1=2 m, and w2=2 m. A specific example in which the camera unit 11 and the camera unit 12 of the present embodiment include this ground region in the imaging region will be explained.

For example, it is assumed that a camera unit in which the vertical angle of view θv and the horizontal angle of view θh of the high-resolution area 10a are each 23.6 degrees, and the vertical angle of view θlv and the horizontal angle of view θlh of the high-resolution area 10a are each 66.4 degrees, is installed at positions of x1=0.9 m, z1=0.3 m, h1=1.4 m, x2=4.1 m, z2=0.3 m, and h2=1.6 m.

In this case, it suffices if the angle φv in the vertical direction and the angle φh in the horizontal direction of the optical axis of the camera unit 11 are respectively set so as to satisfy the conditions of −36.4°≤φv≤15.9°, −18.9°≤φh≤39.5° obtained from the above Formulae 2 to 5.

Additionally, it suffices if the angle φv in the vertical direction and the angle φh in the horizontal direction of the optical axis of the camera unit 12 are respectively set so as to satisfy the conditions of −18.1°≤φv≤40.1°, −43.3°≤φh≤21.3° obtained from the above Formulae 6 to 9.

Additionally, in order to include the horizontal direction in the front, rear, left and right directions in the high-resolution region 10a for imaging a region in a distance away from the periphery region of the vehicle, the angle φv of the optical axis of the camera unit 11 in the vertical direction and the angle φh of the optical axis of the camera unit 11 in the horizontal direction are respectively calculated from Formula 10 and Formula 11. In addition, it suffices if the camera unit 11 is installed so as to satisfy 0.0°≤φv≤23.6°, −23.6°≤φh≤0.0°, which are the calculation results.

In addition the angle φv in the vertical direction and the angle φh in the horizontal direction of the optical axis of the camera unit 12 may respectively be set so as to satisfy 0.0°≤φv≤23.6°, −23.6°≤φh≤0.0°, which are obtained from the above Formula 12 and Formula 13.

In addition, it is desirable that the camera unit 11 is installed so as to satisfy 0.0°≤φv≤15.9°, −18.9°≤φh≤0.0° that are obtained from Formula 2 to Formula 5, Formula 10, and Formula 11 so that the predefined region of the bird's-eye view video image is included in the angle of view and the image in a distance away from the periphery region of the vehicle is captured.

Similarly, it is desirable that the camera unit 12 is installed so as to satisfy 18.1°≤φv≤0.0°, 0.0°≤φh≤21.3°, which are obtained from Formula 6 to Formula 9, Formula 12, and Formula 13.

As described above, in the first embodiment, by installing two camera units under the first condition and the second condition, it is possible to capture the image of the predefined region for the bird's-eye view video image and further capture the periphery of the vehicle with high resolution.

Second Embodiment

In addition to the configuration of the first embodiment, an installation condition in a case in which the camera unit is installed so as to also serve as the electronic side mirror will be explained. Here, an imaging region that is necessary for the electronic side mirror display (a predefined region on the rear of the side face of the vehicle) will be explained with reference to FIG. 8.

Figure 8:
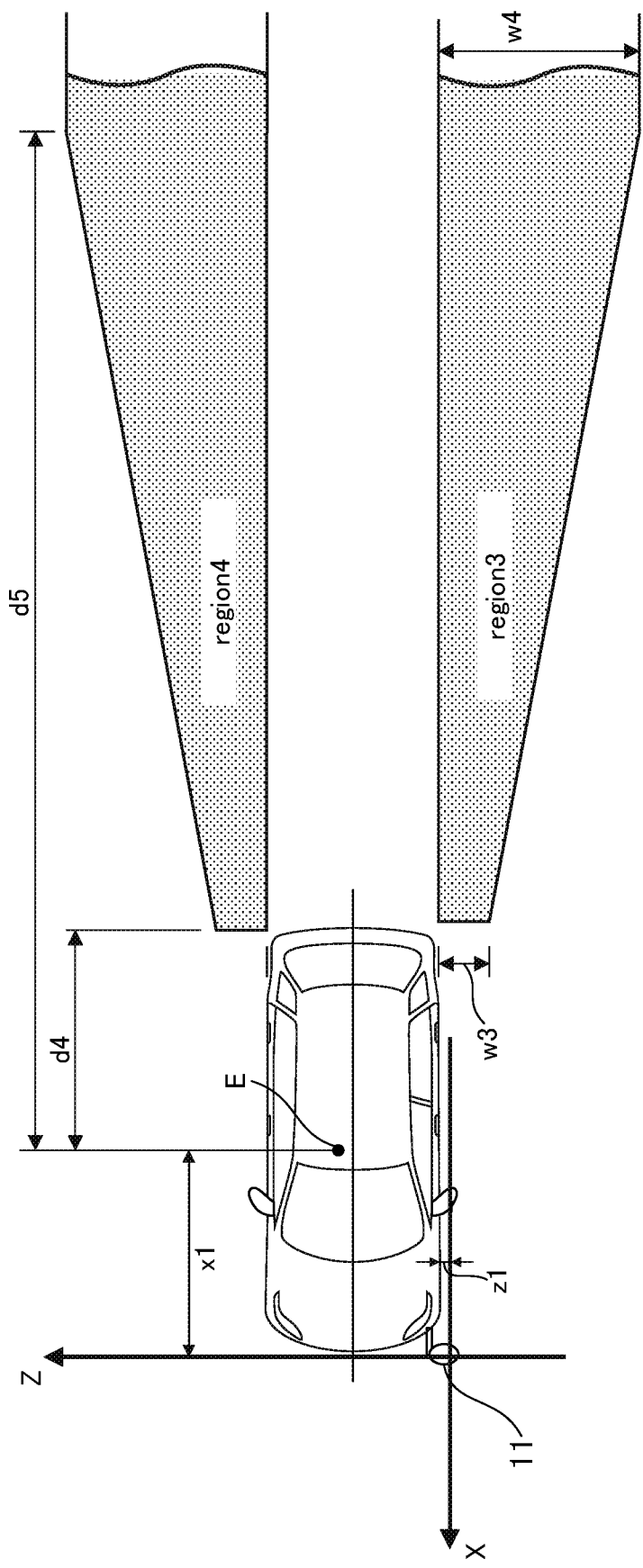
FIG. 8 is a top plan view of the vehicle 1 according to the second embodiment.

FIG. 8 is a plan view of the vehicle 1 according to the second embodiment as viewed from above, and the X and Z directions are based on the installation position of the camera unit 11 as an origin. The predefined region on the rear of the side face of the vehicle is a region on the ground surface as shown by hatching in FIG. 8, and is a region that the driver should check with the side mirror of the vehicle.

The predefined region on the rear of the side face of the vehicle is a region on the ground surface defined by a width w3 from a side face of the vehicle at a rear distance d4 from the driver's viewpoint E and a width w4 from a side face of the vehicle at a rear distance d5 from the driver's viewpoint E. In the predefined region in the rear of the side face of the vehicle, the region on the passenger seat side is referred to as "region3", and the region on the driver's seat side is referred to as "region4". The region3 and the region4 have a line symmetric shape with respect to the center line in the longitudinal direction of the vehicle 1.

An installation condition will be explained in which the camera unit 11 installed on the passenger seat side can horizontally capture a high-resolution image while capturing an image of the predefined region, region3, in the rear of the side face of the vehicle. Since the far side of the region 3 that is the predefined region in the rear of the side face of the vehicle continues to an unlimited distance in the rear of the vehicle, the camera unit 11 is installed so that an unlimited distance, that is, a horizontal direction of the width w4 can be imaged.

Additionally, in order to confirm an object that is separated from the driver by a video image captured by the camera, the installation in which an image can be captured in the ground direction to the horizontal direction in the vicinity with high resolution is desirable.

Therefore, in the second embodiment, the camera unit 11 is installed so as to satisfy Formula 14 below in order that the horizontal angle (−90°) is included in the range between the high-resolution region 10a (φv−θv−θlv) and (the angle of φv−θlv) of the camera unit 11.

$$\varphi v = \theta v - \theta l v < -90° < \varphi v - \theta l v \quad \text{(Formula 14)}$$

Additionally, the unit is installed so that the leading region (region of the width w3) of the predefined region, region 3, in the traveling direction, which is separated backward by d4 from the viewpoint position E, is included in the imaging angle of view in addition to Formula 14 so that the predefined region, region 3, on the side face of the vehicle is included in the imaging angle of view of the camera unit 11.

That is, the angle (−A tan (x1+d4)/h) in the leading region direction of region 3 separated backward by d4 from the viewpoint position E is included in the angle of view (φv−θv−θ1v) to (φv+θv+θ1v) of the camera unit 11. For this purpose, the installation is performed so as to satisfy the following Formula 15.

$$\varphi v - \theta v - \theta 1v \leq -A\tan\left((x1 + d4)/h1\right) \leq \varphi v + \theta v + \theta 1v \quad \text{(Formula 15)}$$

By installing the camera unit so as to satisfy the installation conditions (third condition) of Formula 14 and Formula 15 described above, the camera unit 11 can capture an image in the horizontal direction with high resolution while capturing the predefined region, region 3, in the rear of the side face of one side of the vehicle 1. Note that, here, the side face on one side of the vehicle 1 is the side face on the passenger seat side.

As described above, by satisfying the conditions of Formula 14 and Formula 15, it is possible to include the rear of the side face of the vehicle 1 in the imaging angle of view. Furthermore, in order to include the periphery of the vehicle in the imaging angle of view for the bird's-eye view video image, in addition to the conditions of Formula 14 and Formula 15 and Formula 1 to Formula 5, it is desirable to direct the optical axis in the ground direction. Furthermore, in order to image the periphery of the vehicle with high resolution for the periphery detection, it is desirable to add the conditions of above Formula 14 and Formula 15, and Formula 10 and Formula 11.

Third Embodiment

The imaging region that is necessary for the display for the front monitoring device for confirming the safety in front (the predefined region under the front face of the vehicle) will be explained with reference to FIG. 9 to FIG. 11.

Figure 9:
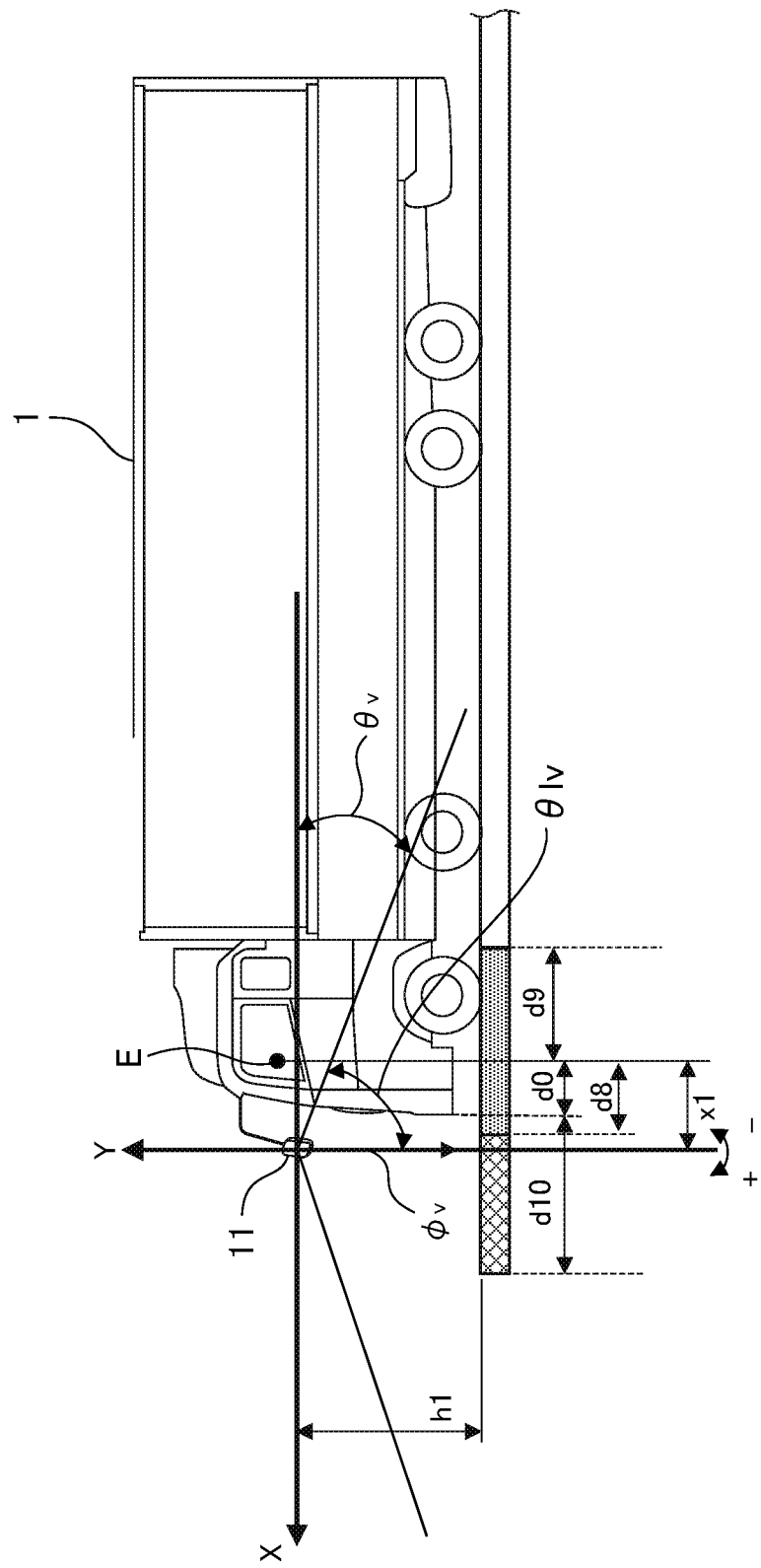
FIG. 9 is a side view for explaining a relation between the camera unit 11 and the vehicle 1 according to the third embodiment.
Figure 10:
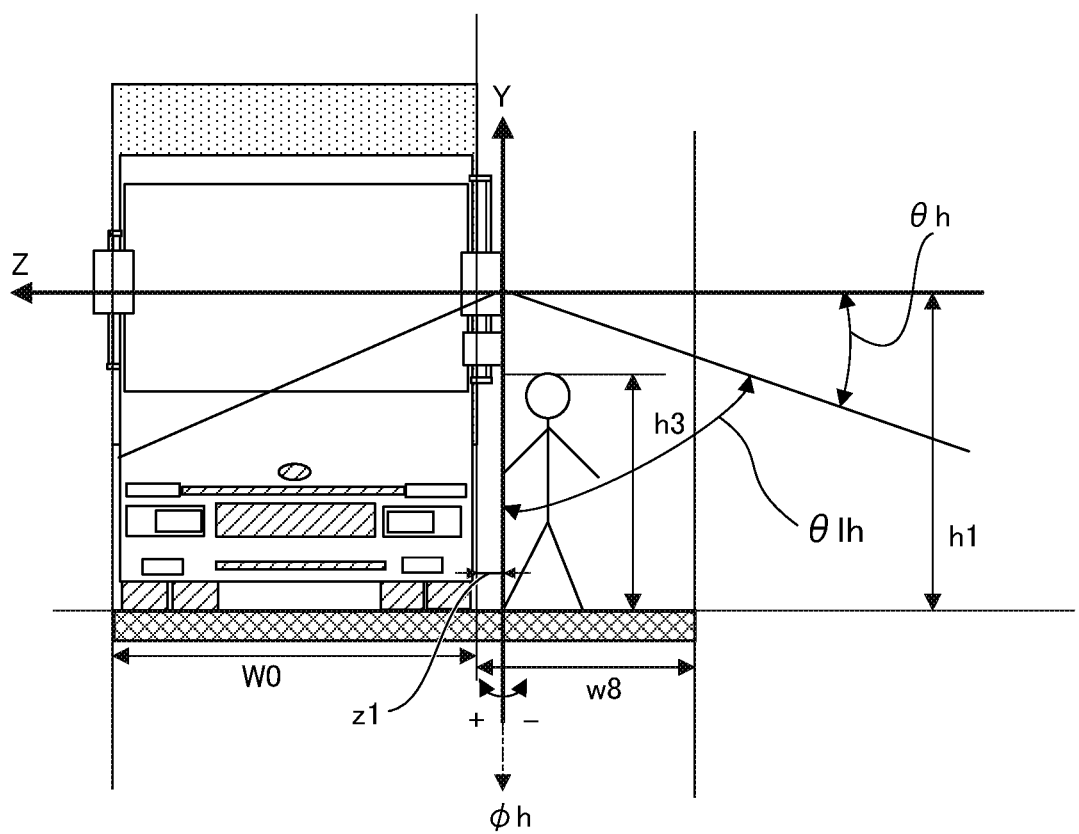
FIG. 10 is a diagram for explaining a predefined region under a front face of a vehicle according to the third embodiment.

FIG. 9 is a side view for explaining a relation between the camera unit 11 and the vehicle 1 according to the third embodiment, and FIG. 10 is a view for explaining a predefined region below the front face of the vehicle according to the third embodiment, and is a front view when the vehicle 1 is viewed from the front face.

Figure 11:
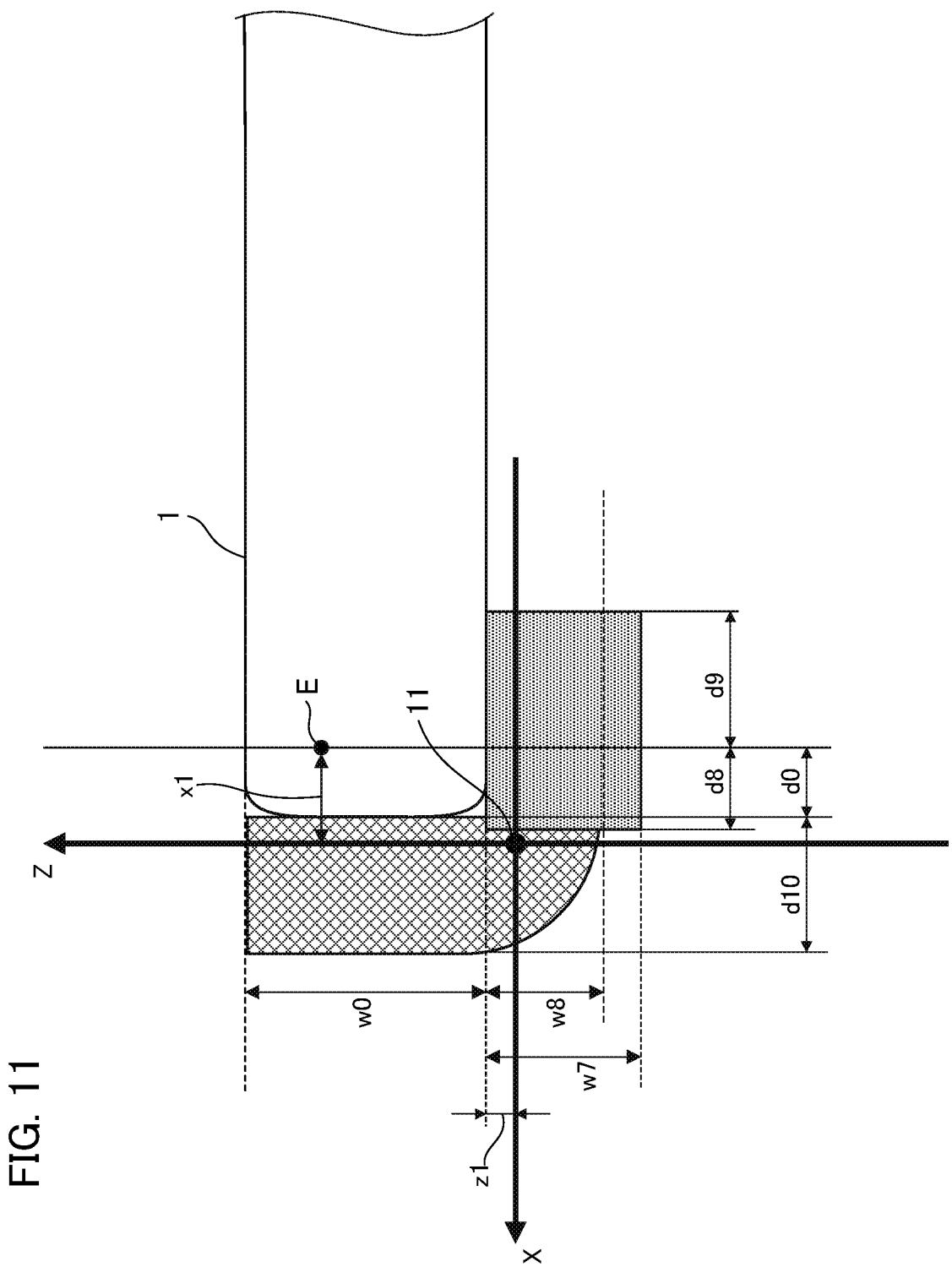
FIG. 11 is a plan view of the vehicle 1 as viewed from the upper direction for explaining a predefined region under the front face of the vehicle and the side face on the passenger seat side of the vehicle according to the third embodiment.

FIG. 11 is a plan view of the vehicle 1 as viewed from above, for explaining the predefined region on the lower front side of the vehicle and on the side of the passenger seat side of the vehicle according to the third embodiment. The X, Y, and Z directions and angles in FIG. 9 to FIG. 11, respectively correspond to those in FIGS. 5A, 5B, and FIG. 8, and have the same relation.

E in FIG. 9 and FIG. 11 represents the viewpoint position of the driver, and the positional relation between the camera unit 11 and the vehicle 1 (x1, h1, z1) and the relation between the optical axis and the imaging angle of view (Φv, θv, θ1v, Φh, θh, θ1h) in FIG. 9 and FIG. 10 are also the same as those in FIGS. 5A and 5B.

The predefined region below the front face of the vehicle and the predefined region on the side face on the passenger seat side will be explained with reference to FIG. 9 to FIG. 11. The predefined region below the front face of the vehicle is a region to be confirmed by the driver with the side under mirror of the vehicle.

Here, it is assumed that, in FIG. 9 and FIG. 11, d10 is a distance from the leading end of the vehicle 1 to a distance under the front side to be confirmed, d0 is a distance from the viewpoint position E to the leading end of the vehicle 1, w0 is a width of the vehicle 1, and w8 is a distance to a distant location on the side of the vehicle body to be confirmed.

That is, the predefined region under the front face of the vehicle is a region represented by a region on the ground surrounded by the distance d10 and (w0+w8). Therefore, the installation condition in which the camera unit 11 can image the predefined region in the front lower direction of the vehicle 1 is a condition in which the imaging angle of view of the camera unit 11 includes the region surrounded by d10 and (w0+w8) (fourth condition).

Therefore, in the third embodiment, the camera unit 11 is installed so as to satisfy Formula 16 and Formula 17 below as a fourth condition so that the ground surface at the distance d10 from the front end portion is included in the imaging angle of view (φv−θv−θ1v) to (φv+θv+θ1v) of the camera unit 11.

$$\varphi v - \theta v - \theta 1v \leq -A\tan\left((x1 - d0)/h1\right) \leq \varphi v + \theta v + \theta 1v \quad \text{(Formula 16)}$$

$$\varphi v - \theta v - \theta 1v \leq A\tan\left((d0 + d10 - x1)/h1\right) \leq \varphi v + \theta v + \theta 1v \quad \text{(Formula 17)}$$

Additionally, the camera unit is installed so as to satisfy the following Formula 18 and Formula 19 so that the end portions of w0 and w8 are included in the range of (w0+w8) in the imaging angle of view of the camera unit 11.

$$\varphi h - \theta h - \theta 1h \leq -A\tan\left((w0 + z1)/h1\right) \leq \varphi h + \theta h + \theta 1h \quad \text{(Formula 18)}$$

$$\varphi h - \theta h - \theta 1h \leq A\tan\left((w8 - z1)/h1\right) \leq \varphi h + \theta h + \theta 1h \quad \text{(formula 19)}$$

The predefined region under the front of the vehicle is a region that the driver should check with a side under mirror of the vehicle. Here, it is assumed that a forward distance on the side face on the passenger seat side to be confirmed from the viewpoint position E is d8, a rearward distance on the side face on the passenger seat side to be confirmed is d9, and a distance to a distant location on the side of the vehicle body to be confirmed is w7.

At this time, the installation conditions under which the camera unit 11 can capture an image of the predefined region on the side face of the passenger seat side of the vehicle 1 satisfy Formula 20 and Formula 21 below as a fifth condition so that the region surrounded by (d8+d9) and w7 is included in the imaging angle of view of the camera unit 11.

$$\varphi v - \theta v - \theta 1v \leq -A\tan\left((x1 - d8)/h1\right) \leq \varphi v + \theta v + \theta 1v \quad \text{(Formula 20)}$$

$$\varphi v - \theta v - \theta 1v \leq -A\tan\left((x1 + d9)/h1\right) \leq \varphi v + \theta v + \theta 1v \quad \text{(Formula 21)}$$

Additionally, the camera unit 11 is installed so as to satisfy the following Formula 22 as an installation condition so that the end portion of w7 is included in the imaging angle of view of the camera unit 11.

$$\varphi h - \theta h - \theta 1 h \le A \tan\left((w7 - z1)/h1\right) \le \varphi h + \theta h + \theta 1 h \quad \text{(Formula 22)}$$

In the present embodiment, in the camera unit 11, it is possible to realize a movable apparatus capable of imaging a predefined region below the forward side of the vehicle in a wide range with high resolution by installing the imaging apparatus so as to satisfy such conditions.

Note that the present embodiment may not satisfy all of the above first condition to the fifth condition, and the installation may be performed so as to satisfy at least one of the first condition and the second condition and at least one of the third condition to the fifth condition.

Note that, in a large-sized vehicle, it is desirable that a field of view in a wider range (a predefined region of a wide range in the rear of the side face of the vehicle) than the above-described predefined region in the rear of the side face of the vehicle can be confirmed. The predefined region in a wide range in the rear of the side face of the vehicle will be explained with reference to FIG. 12.

Fourth Embodiment

Figure 12:
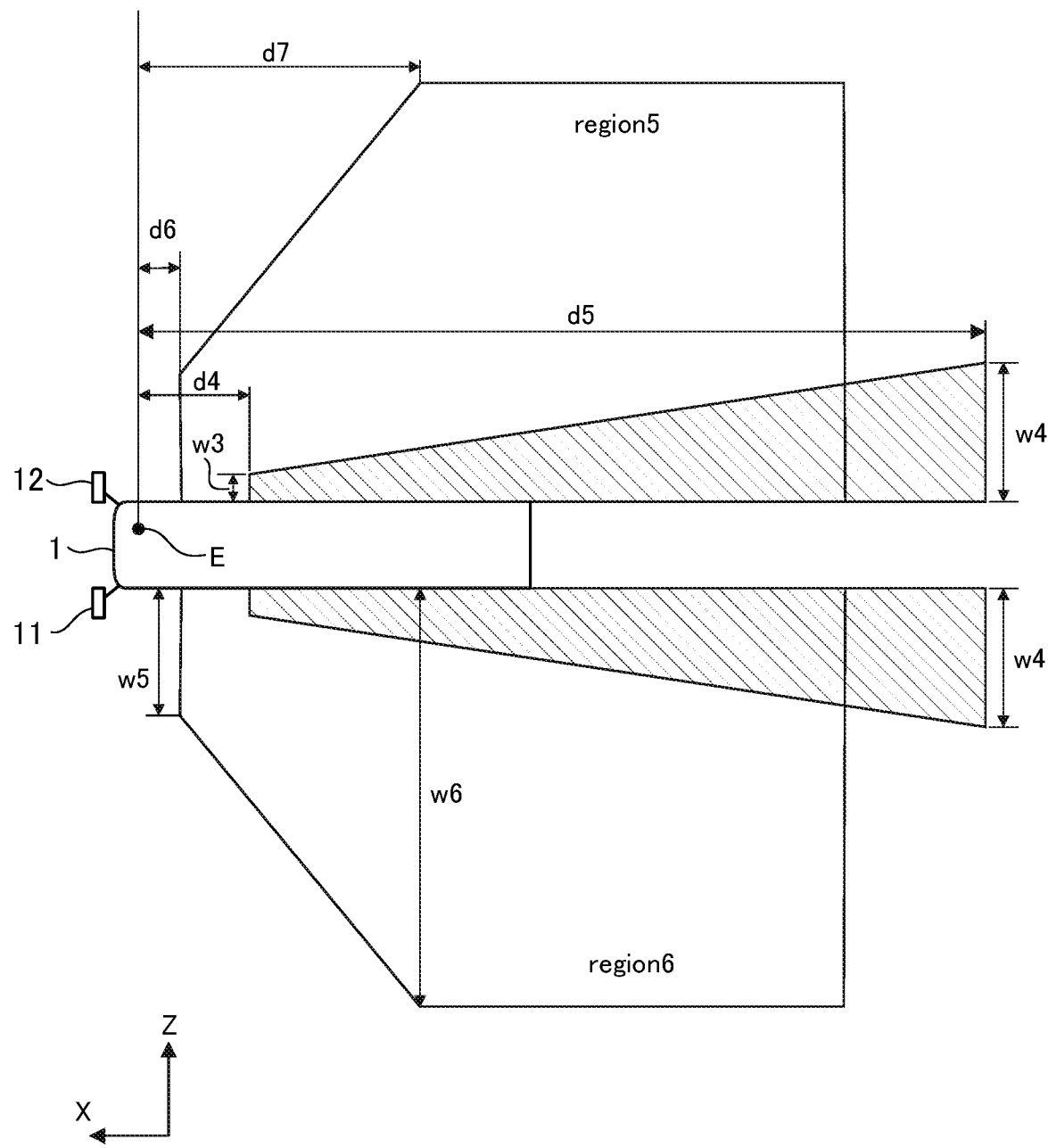
FIG. 12 is a plan view of the vehicle 1 viewed from above for explaining a predefined region in a wide angle in the rear of the side face of the vehicle according to the fourth embodiment.

FIG. 12 is a plan view of the vehicle 1 as viewed from above, for explaining a predefined region in the wide angle in the rear of the side face of the vehicle according to the fourth embodiment. The region on the ground surface on the side and rear of the vehicle as shown by the hatching in FIG. 12 is the same as the predefined region in the rear of the side face of the vehicle as explained in FIG. 9.

It is assumed that the predefined regions in a wide range in the rear of the side face of the vehicle are ground surface regions (region 5, region 6) defined by a width w5 from the vehicle side face at a distance d6 rearward from the driver's viewpoint position E and a width w6 from the vehicle body side face at a distance d7 rearward from the viewpoint position E. The camera unit 11 disposed on the passenger seat side can correspond to the installation conditions of a large vehicle by being installed so that the predefined region, region 5, of a wide range in the rear of the side face of the vehicle is included in the imaging range.

In particular, in a large vehicle, it is desirable to capture an image of a detection region for a side collision warning that detects a moving object on the side of the vehicle and warns the driver when there is a possibility of a collision. This detection region is a region in which there is a high possibility of a vehicle accident involving a turn or collision when an object is present in the detection region when the own vehicle, for example, turns left.

Fifth Embodiment

The camera unit 11 disposed on the passenger seat side can detect a moving object on the passenger seat side by being installed such that the detection region is included in the imaging range. The relation between the predefined region, the detection region, and the object on the side of the vehicle passenger seat side in the fifth embodiment will be explained with reference to FIG. 13 and FIG. 14.

Figure 13:
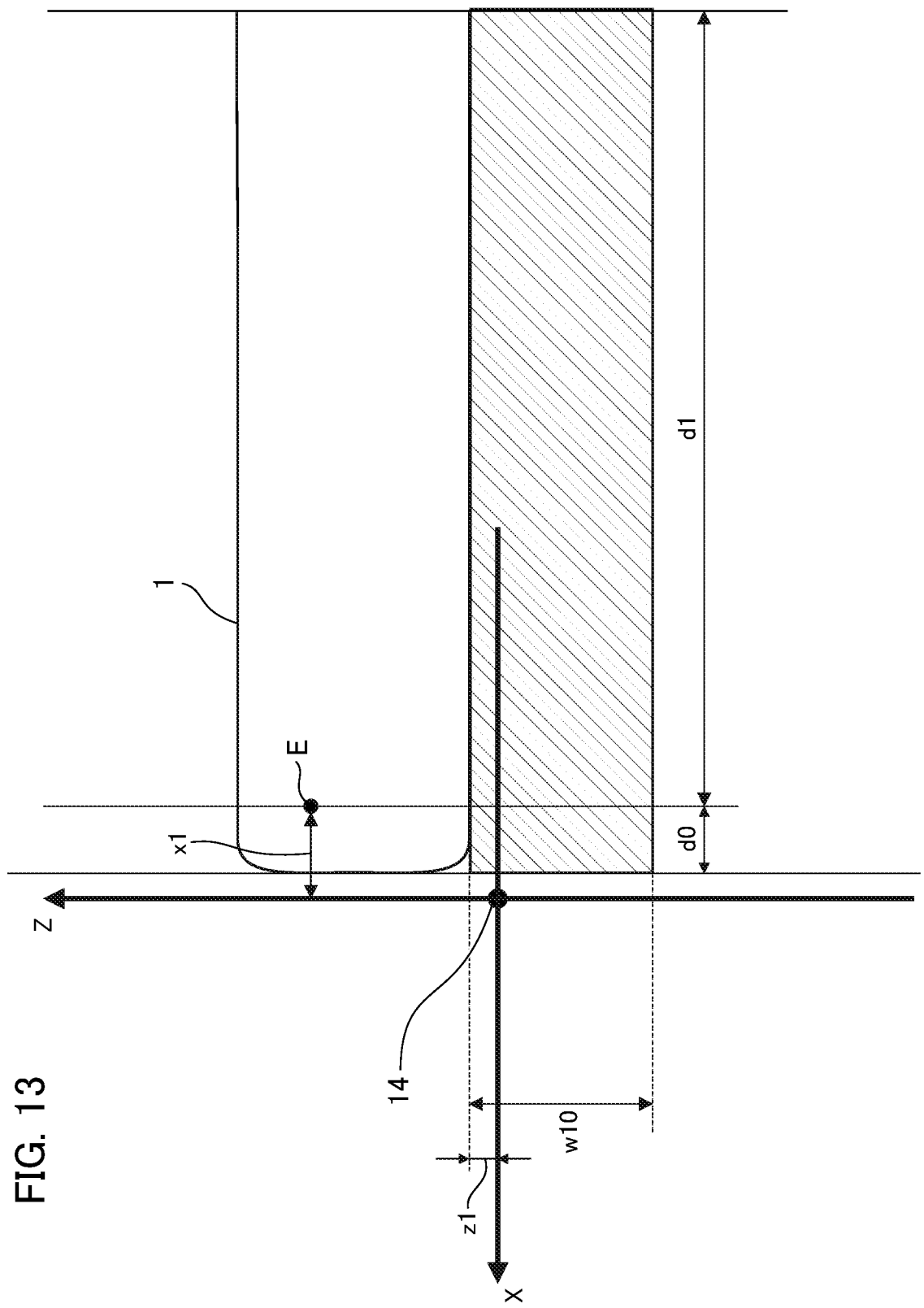
FIG. 13 is a schematic plan view of the vehicle 1 as viewed from the upper direction for explaining a predefined region of the side face on the passenger seat side of the vehicle according to the fifth embodiment.

FIG. 13 is a schematic plan view of the vehicle 1 as viewed from above for explaining the predefined region on the side face on the passenger seat side of the vehicle according to the fifth embodiment.

Figure 14:
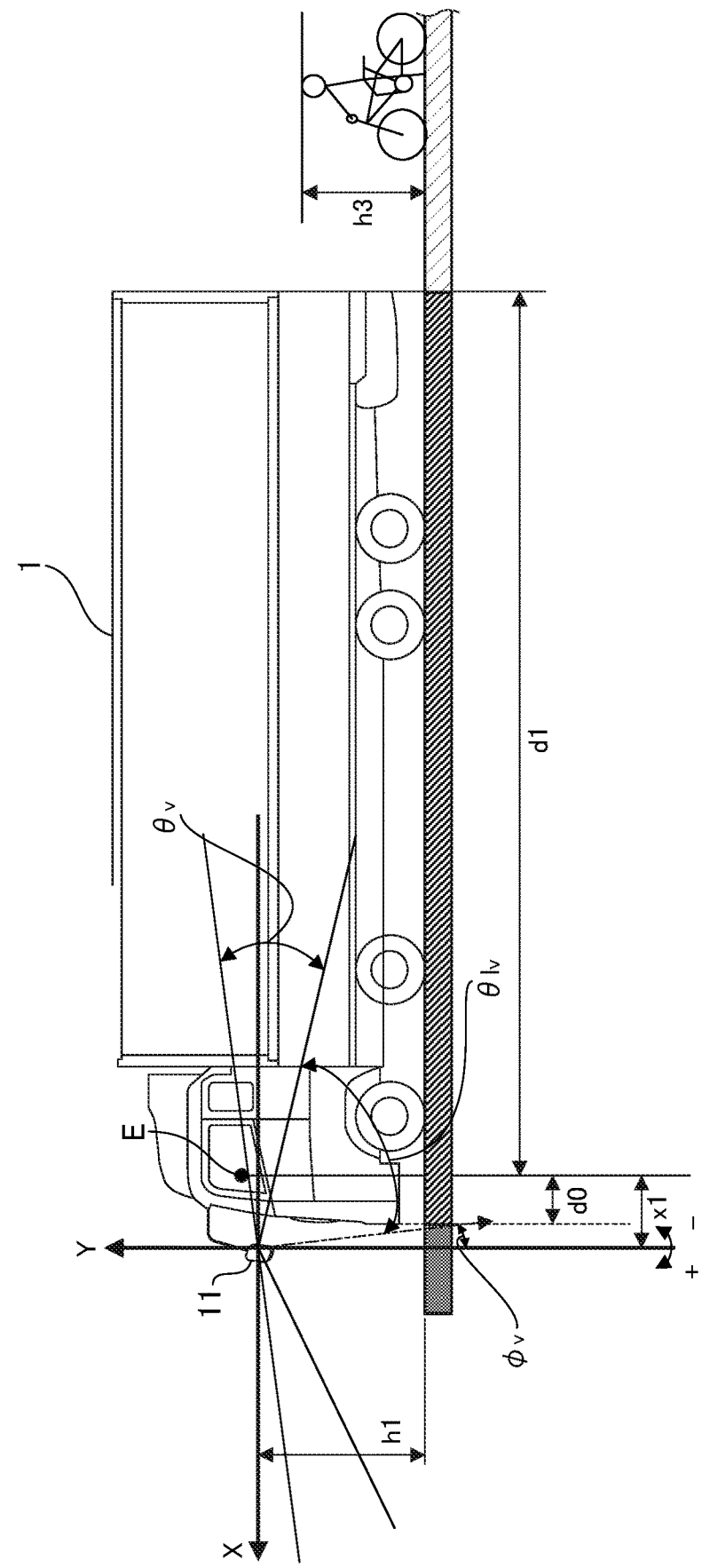
FIG. 14 is a side face view of the vehicle 1 according to the fifth embodiment.

FIG. 14 is a side face view of the vehicle 1 according to the fifth embodiment as viewed from the side. The X, Y, and Z directions and angles in FIG. 13 and FIG. 14 have the same relation as in FIG. 9 to FIG. 11. E described in FIG. 13 and FIG. 14 is the same as E described in FIG. 9 to FIG. 11, and represents the viewpoint position of the driver.

As shown in FIG. 13, the predefined region on the side face of the passenger seat side of the vehicle is a region surrounded by a distance (d0+d1) from the front face of the vehicle body to the rear side of the vehicle body to be detected and a distance w10 from the side face of the vehicle body to a distance on the side of the vehicle body to be detected. The size of the moving object to be detected is an object having a height d3. Accordingly, the detection region for side collision warning is a region surrounded by the predefined region on the side face of the vehicle passenger seat side and the height h3.

The camera unit 11 is installed so that the detection region for the side collision warning is included in the angle of view, and thus can correspond to the installation conditions of a large vehicle. It is desirable that the height h1 of the camera unit 11 is higher than h3 of the moving object to be detected. That is, it is desirable to satisfy the following Formula 23.

$$h1 \ge h3 \quad \text{(Formula 23)}$$

By setting such an installation condition, the moving object having the height h3 can be included in the imaging range without making the imaging angle of view of the camera unit wider than the condition of h1<h3. For example, in a case in which a bicycle is included in an object to be detected, it is desirable to set h3 to 1.7 meters.

Additionally, in a case in which a pedestrian is included in object to be detected, it is desirable to set h3 to 2 meters. In a case in which the offset x1 of the camera unit is larger than the front end of the vehicle, the ground of the entire region of the w10 at that position is included in the imaging range so that the detection target in the detection region is reflected.

Note that, it is desirable that the camera unit 11 is disposed on the outside obliquely front of the corner of the vehicle body on the passenger seat side in order to perform high-resolution imaging for a plurality of required imaging ranges and high-resolution imaging directions with fewer cameras.

The installation conditions of the camera unit 11 on the passenger seat side according to the fifth embodiment have been explained. However, in the case in which the camera unit 11 is disposed on the driver's seat side, it is possible to perform high-resolution imaging of a plurality of required imaging ranges and high-resolution imaging directions with fewer cameras by performing installation under the similar installation conditions. Note that, in a case in which the unit is disposed on the driver's seat side, it is desirable to dispose the unit more towards the outside diagonal front than the front corner portion (corner) of the vehicle body on the driver's seat side.

Sixth Embodiment

In addition to the configuration of the first embodiment, the installation conditions according to the sixth embodiment in the case in which the camera unit is installed to enhance safety of the rear view, will be explained.

In order to capture an image of the left and right directions of the rear face of the vehicle and the rear of the side face of the vehicle, it is desirable that the camera unit 12 is disposed at a position where the vehicle 1 is not reflected in the center of the optical axis. For example, in order to capture an image in the left and right directions in the rear of the vehicle, it is desirable that the offset x2 of the camera unit 12 is larger than the leading end of the rear face of the vehicle 1. Furthermore, in order to capture an image of the rear of the side face of the vehicle, it is desirable that the offset z2 of the camera unit 12 is installed more toward the outside (Z direction in FIG. 6) than the side of the vehicle 1.

Figure 15:
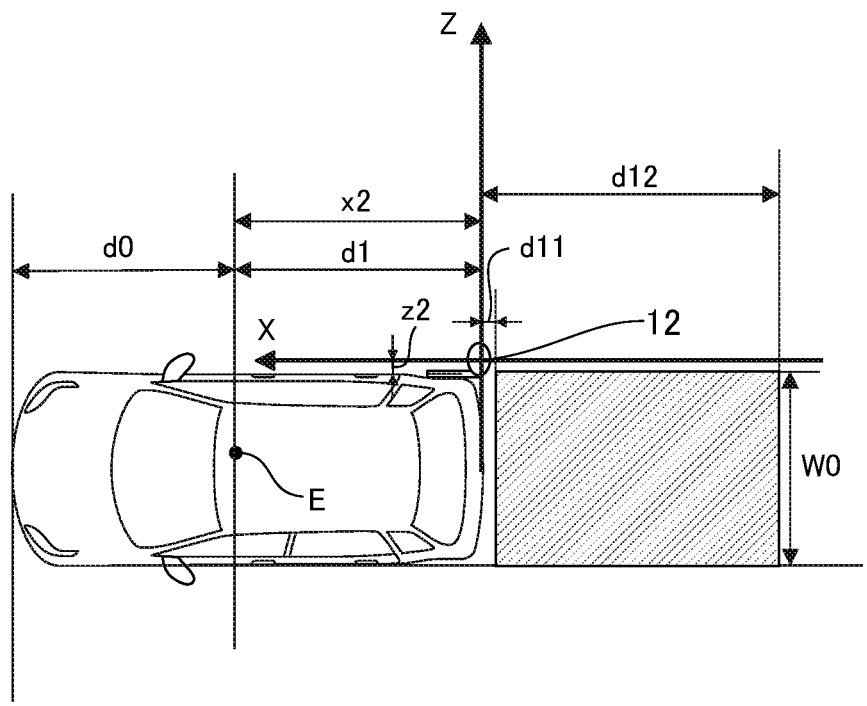
FIG. 15 is a plan view of the vehicle 1 as viewed from the upper direction for explaining a predefined region under the rear face of the vehicle according to the sixth embodiment.

Next, the imaging region that is necessary for the display for the rear lower portion used for the rear monitoring device (the predefined region below the rear face of the vehicle) in the sixth embodiment will be explained with reference to FIG. 15. FIG. 15 is a plan view of the vehicle 1 viewed from above for explaining the predefined region below the rear face of the vehicle according to the sixth embodiment.

The X, Y, and Z directions and angles in FIG. 15 respectively correspond to those in FIGS. 6A and 6B, and have the same relation. E in FIG. 15 is the same as E in FIG. 6A, and represents the viewpoint position of the driver.

The positional relation (x2, h2, z2) between the camera unit 12 and the vehicle 1 and the relation ($\Phi v$, $\theta v$, $\theta lv$, $\Phi h$, $\theta hl$) between the optical axis and the imaging angle of view as shown in FIG. 15 are also the same as those in FIGS. 6A and 6B. d1 in FIG. 15 is a distance from the driver's viewpoint position E to the rear face end of the vehicle 1.

It is assumed that the predefined region below the rear face of the vehicle shown in FIG. 15 is a region to be confirmed by the driver on the display device when the vehicle moves backward, and a distance from a predetermined position on the side to be confirmed, which is only d11 away from the rear face of the vehicle, to a predetermined position on the far side to be confirmed from the rear face of the vehicle is d12, and the vehicle width of the vehicle 1 is w0.

In this case, the predefined region below the rear face of the vehicle is a region represented by a region on the ground face surrounded by d12 and w0, and it is desirable that the camera unit 12 can capture an image of an object at a height h3 within a predetermined predefined region to be confirmed in the rear of the vehicle 1.

Therefore, the installation condition (sixth condition) under which the camera unit 12 can capture an image of the predefined region under the rear face of the vehicle is a condition in which the imaging angle of view of the camera unit 12 includes a region surrounded by d12, w0, and height h3.

That is, the camera unit 12 is installed to satisfy the following installation conditions (Formula 24, Formula 25, and Formula 27) or installation conditions (Formula 24, Formula 26, and Formula 28) such that the above-described region is included within the imaging angle of view ($\varphi v - \theta v - \theta lv$) to ($\varphi v + \theta v + \theta lv$) of the camera unit 12. Note that it is assumed that z2 is a distance between the installation position of the camera unit 12 (second installation position) and the side face of the vehicle.

$$\varphi v - \theta v - \theta l v \le -A\tan\left((d1 - x2 + d11)/h2\right) \le \varphi v + \theta v + \theta l v \quad \text{(Formula 24)}$$

(When h2≥h3)

$$\varphi v - \theta v - \theta l v \le -A\tan\left((d1 - x2 + d12)/(h2 - h3)\right) \le \quad \text{(Formula 25)}$$
$$\varphi v + \theta v + \theta l v$$

(When h2<h3)

$$\varphi v - \theta v - \theta l v \le \quad \text{(Formula 26)}$$
$$-A\tan\left((h3 - h2)/(d1 - x2 + d12)\right) - 90° \le \varphi v + \theta v + \theta l v$$

(When h2≥h3)

$$\varphi h - \theta h - \theta l h \le A\tan\left((w0 + z2)/(h2 - h3)\right) \le \varphi h + \theta h + \theta l h \quad \text{(Formula 27)}$$

(When h2>h3)

$$\varphi h - \theta h - \theta l h \le \quad \text{(Formula 28)}$$
$$A\tan\left((h3 - h2)/(w0 + z2)\right) + 90° \le \varphi h + \theta h + \theta l h$$

By providing the camera unit 12 in this manner, the camera unit 12 can appropriately capture an image of the predefined region in the downward direction in the rear of the vehicle. In particular, in a large vehicle, it is necessary to capture an image of a detection region for side collision warning that detects a moving object on the side of the passenger seat of the vehicle and warns the driver when there is a possibility of a collision.

This detection region is a region in which there is a high possibility of a vehicle accident involving a turn or collision when an object is present in the detection region when the own vehicle, for example, turns left. In the case in which the camera unit is disposed on the passenger seat side, it is possible to correspond to the installation conditions for detecting a moving object on the passenger seat side by performing the installation in which the detection region is included in the imaging range.

Additionally, since it is necessary to display a video image at a distance in the rear of the vehicle on the display unit so that a driver can confirm the rear of the vehicle with an electronic room mirror, it is desirable that a predefined region in the rear of the vehicle is imaged in a high-resolution region so that a distant location can be confirmed.

Seventh Embodiment

Figure 16:
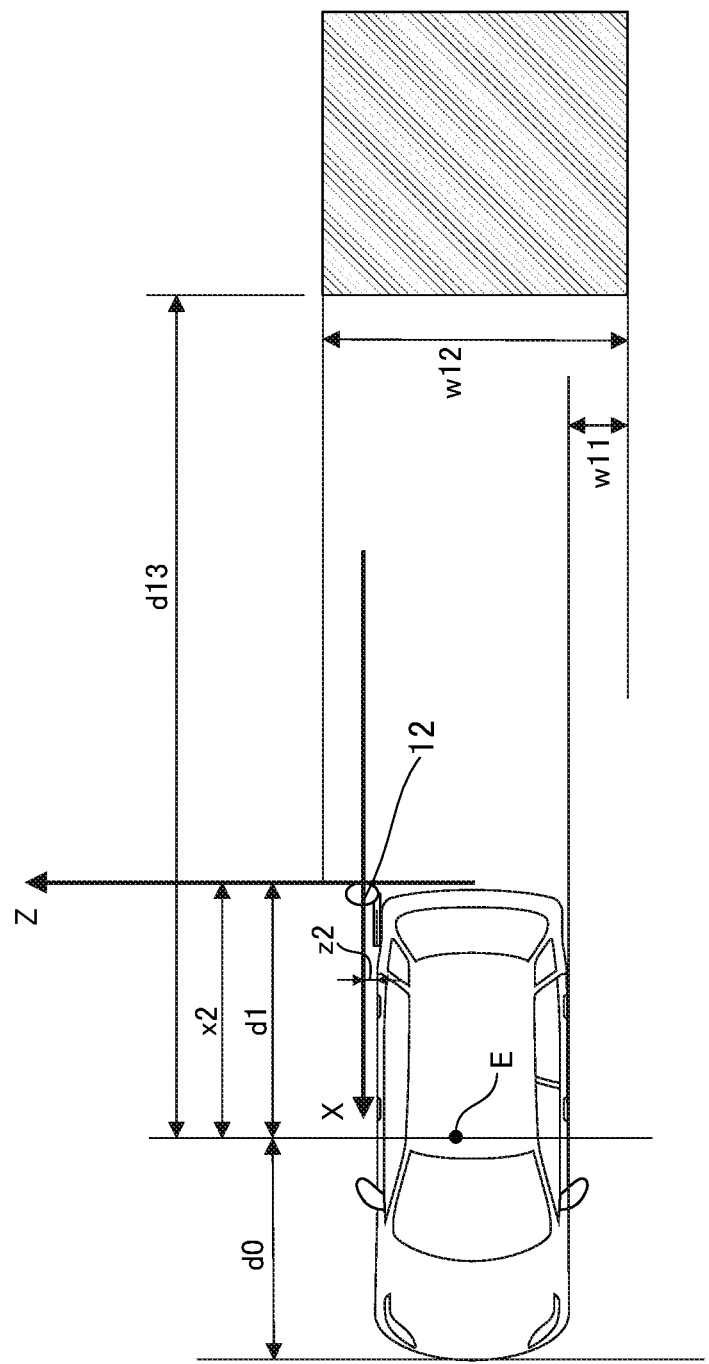
FIG. 16 is a diagram for explaining a predefined region in the rear of the vehicle according to the seventh embodiment.

FIG. 16 is a diagram for explaining a predefined region in the rear of the vehicle according to the seventh embodiment, and as shown in FIG. 16, the predefined region in the rear of the vehicle is set to a range of width w12 and distance d13 as a predefined region. Additionally, a width from the side face of the vehicle to the predefined region is set to a width w11. An installation condition (condition 7) under which the camera unit 12 can capture an image of such a predefined region will be explained.

In order to capture an image of this predefined region, it is desirable to satisfy the installation conditions (Formula 29 and Formula 30) such that, for example, the above region is included in the imaging angle of view ($\varphi v - \theta v - \theta lv$) to ($\varphi v + \theta v + \theta lv$) of the camera unit 12.

$$\varphi v - \theta v - \theta lv \leq -A\tan\left((d13 - x2)/h2\right) \leq \varphi v - \theta lv \quad \text{(Formula 29)}$$

$$\varphi h - \theta h - \theta lh \leq A\tan\left((w12 - w11 - z2)/h2\right) \leq \varphi h + \theta h + \theta lh \quad \text{(Formula 30)}$$

By installing the imaging apparatus by such an installation method, the camera unit 12 can realize a movable apparatus capable of capturing an image of a predefined region in the rear of the vehicle with high resolution.

The installation conditions of the camera unit 12 have been explained above. Note that, in order to capture a plurality of requested imaging ranges and high-resolution imaging directions with the number of cameras less than the number of directions in which high-resolution imaging is required, it is desirable that the camera unit 12 is disposed on the outside diagonally in the rear from the rear corner (corner portion) of the passenger seat side.

In the present embodiment, it is not necessary to satisfy all of the first condition, the second condition, the sixth condition, and the seventh condition, and the installation may be performed so as to satisfy at least one of the first condition and the second condition and at least one of the sixth condition and the seventh condition.

Above, the installation conditions of the camera unit 12 on the driver's seat side have been explained. Note that a plurality of required imaging ranges and high-resolution imaging directions on the driver seat side can be imaged with a number of cameras less than the number of directions in which high-resolution imaging is necessary by disposing the camera unit in similar installation conditions also in the case in which the camera unit is disposed on the passenger's seat side. Additionally, it is also desirable that, in the case in which the camera unit is disposed on the passenger seat side, it is disposed on the outside diagonally in the rear from the rear corner of the passenger seat side.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

Although, in the above explanation, for example, a vehicle such as an automobile has been explained as an example of a movable apparatus, the movable apparatus is not limited to an automobile and may be any movable apparatus. For example, the movable apparatus includes a ship, an airplane, a drone, a robot, an AAV, and the like. In addition, the movable apparatus may be remotely controlled from an external device based on the bird's-eye image that has been generated by the external device.

In addition, as a part or the whole of the control according to the embodiments, a computer program realizing the function of the embodiments described above may be supplied to the movable apparatus and the like through a network or various storage media. Then, a computer (or a CPU, an MPU, or the like) of the movable apparatus and the like may be configured to read and execute the program. In such a case, the program and the storage medium storing the program configure the present invention. Then, a computer (or a CPU, an MPU, or the like) of the movable apparatus and the like may be configured to read and execute the program. In such a case, the program and the storage medium storing the program configure the present invention.

Additionally, the present invention also includes those realized using, for example, using, for example, at least one processor or circuit configured to function of the embodiments explained above. Note that a plurality of processors may be used for distributed processing.

This application claims the benefit of Japanese Patent Application No. 2023-042522, filed on Mar. 17, 2023, which is hereby incorporated by reference herein in its entirety.

What is claimed is:

1. A movable apparatus in which a first imaging apparatus and a second imaging apparatus provided with an optical system for forming an optical image having a low resolution region in the vicinity of an optical axis and a high resolution region outside the low resolution region on a light receiving surface of an imaging element are used, the first imaging apparatus is installed at a first installation position at a front corner portion of the movable apparatus so that the ground in front of the movable apparatus and the ground in a first side of the movable apparatus are imaged, and the second imaging apparatus is installed at a second installation position at a rear corner portion of the movable apparatus, which is on a diagonal corner side of the first imaging apparatus so that the ground in the rear of the movable apparatus and the ground in a second side of the movable apparatus are imaged, wherein an image height of the optical system is y and θ is a half angle of view, a projection characteristic y(θ) satisfies Formula 1 below:

$$0.2 < 2*f\tan(\theta\max/2)/y(\theta\max) < 0.92. \quad \text{(Formula 1)}$$

2. The movable apparatus according to claim 1, wherein the optical system has a projection characteristic in which an image height with respect to an angle of view per unit is higher in an angle of view of the high-resolution region in comparison to an angle of view of the low-resolution region in the vicinity of the optical axis.

3. The movable apparatus according to claim 1, wherein the optical axis of the optical system is directed toward the ground direction.

4. The movable apparatus according to claim 1, wherein where in a case in which the movable apparatus is viewed from a side face, the angle in the optical axis direction from the vertical direction is φv, the angle of view in the high-resolution region is θv, and the angle of view in the low-resolution region is θlv, and where in a case in which the movable apparatus is viewed from a front direction, the angle in the optical axis direction from the vertical direction is φh, the angle of view of the high-resolution region is θh, and the angle of view of the low-resolution region is θlh, a distance from the viewpoint position of the driver to the front end of the movable apparatus is d0, a distance from the viewpoint position to the rear end of the movable apparatus is d1, a distance from the front end of the movable apparatus to a predetermined position on a lower front side is d2, a distance from the rear end of the movable apparatus to a predetermined position on a lower rear side is d3, a width of the movable apparatus is w0, a width from the left side of the movable apparatus to a predetermined position on a lower left side is w1, a width from the right side of the movable apparatus to a predetermined position on a lower right side is w2, a distance between the viewpoint position and the first installation position is x1, a height of the first installation position is h1, a distance between the left side face of the movable apparatus and the first installation position is z1, a distance between the viewpoint position and the second installation position is x2, a height of the second installation position is h2, and a distance between the right side face of the movable apparatus and the second installation position is z2, the first imaging apparatus is installed so as to satisfy Formula 2 to Formula 5 below:

$$\varphi v - \theta v - \theta lv \leq A\tan((d0 + d2 - x1)/h1) \leq \varphi v + \theta v + \theta lv \quad \text{(Formula 2)}$$

$$\varphi v - \theta v - \theta lv \leq -A\tan((z1 + d1)/h1) \leq \varphi v + \theta v + \theta lv \quad \text{(Formula 3)}$$

$$\varphi h - \theta h - \theta lh \leq A\tan((w1 + w0 + z1)/h1) \leq \varphi h + \theta h + \theta lh \quad \text{(Formula 4)}$$

$$\varphi h - \theta h - \theta lh \leq -A\tan((w1 - z1)/h1) \leq \varphi h + \theta h + \theta lh, \quad \text{(Formula 5)}$$

and the second imaging apparatus is installed so as to satisfy the Formula 6 to Formula 9 below:

$$\varphi v - \theta v - \theta lv \leq A\tan((d0 + x2)/h2) \leq \varphi v + \theta v + \theta lv \quad \text{(Formula 6)}$$

$$\varphi v - \theta v - \theta lv \leq -A\tan((d1 + d3 - x2)/h2) \leq \varphi v + \theta v + \theta lv \quad \text{(Formula 7)}$$

$$\varphi h - \theta h - \theta lh \leq A\tan((w2 - z2)/h2) \leq \varphi h + \theta h + \theta lh \quad \text{(Formula 8)}$$

$$\varphi h - \theta h - \theta lh \leq -A\tan((w1 + w0 + z2)/h2) \leq \varphi h + \theta h + \theta lh. \quad \text{(Formula 9)}$$

5. The movable apparatus according to claim 1, wherein the first side is a passenger seat side of the movable apparatus.

6. The movable apparatus according to claim 1, wherein where, in a case in which the movable apparatus is viewed from a side face, the angle in the optical axis direction from the vertical direction is φv, an angle of view of the high-resolution region is θv, and an angle of view of the low-resolution region is θlv, and in a case in which the movable apparatus is viewed from a front direction, the angle in the optical axis direction from the vertical direction is φh, an angle of view of the high-resolution region is θh, and an angle of view of the low-resolution region is θlh, the first imaging apparatus is installed so as to satisfy Formula 10 and Formula 11 below:

$$\varphi h - \theta h - \theta lh \leq -90° \leq \varphi h - \theta lh \quad \text{(Formula 10)}$$

$$\varphi v + \theta lv \leq 90° \leq \varphi v + \theta v + \theta lv. \quad \text{(Formula 11)}$$

7. The movable apparatus according to claim 1, wherein where, in a case in which the movable apparatus is viewed from a side face, the angle in the optical axis direction from the vertical direction is φv, the angle of view in the high-resolution region is θv, and the angle of view in the low-resolution region is θlv, and where, in a case in which the movable apparatus is viewed from a rear direction, the angle of view in the optical axis direction from the vertical direction is φh, the angle of view in the high-resolution region is θh, the angle of view of the low-resolution region is θlh, the second imaging apparatus is installed so as to satisfy Formula 12 and Formula 13 below:

$$\varphi h + \theta lh \leq 90° \leq \varphi h + \theta h + \theta lh \quad \text{(Formula 12)}$$

$$\varphi v - \theta v - \theta lv \leq -90° \leq \varphi v - \theta lv. \quad \text{(Formula 13)}$$

8. The movable apparatus according to claim 1, wherein where, in a case in which the movable apparatus is viewed from the side face, the angle in the optical axis direction from the vertical direction is φv, the angle of view in the high-resolution region is θv, the angle of view in the low-resolution region is θlv, a predetermined distance in the rear from the driver's viewpoint position is d4, a distance between the viewpoint position and the first installation position is x1, and a height of the first installation position is h1, Formula 14 and Formula 15 below are satisfied:

$$\varphi v - \theta v - \theta lv < -90° < \varphi v - \theta lv \quad \text{(Formula 14)}$$

$$\varphi v - \theta v - \theta lv \leq -A\tan((x1 + d4)/h1) \leq \varphi v + \theta v + \theta lv. \quad \text{(Formula 15)}$$

9. The movable apparatus according to claim 1, wherein where, in a case in which the movable apparatus is viewed from a side face, an angle of an optical axis direction from the vertical direction is φv, an angle of view of the high-resolution region is θv, an angle of view of the low-resolution region is θlv, a distance between a viewpoint position of a driver and the first installation position is x1, a height of the first installation position is h1, a distance from the viewpoint position to a leading end of the movable apparatus is d0, and a distance from the leading end of the movable apparatus to a predetermined position on a lower front side is d10, Formula 16 and Formula 17 below are satisfied:

$$\varphi v - \theta v - \theta lv \leq -A\tan((x1 - d0)/h1) \leq \varphi v + \theta v + \theta lv \quad \text{(Fromula 16)}$$

$$\varphi v - \theta v - \theta lv \leq A\tan((d0 + d10 - x1)/h1) \leq \varphi v + \theta v + \theta lv \quad \text{(Formula 17)}$$

10. The movable apparatus according to claim 9, wherein where, in a case in which a vehicle width of the movable apparatus is w0, a predetermined distance on a side of the movable apparatus is w8, and a distance between the first installation position and a side surface of the movable apparatus is z1, Formula 18 and Formula 19 below are satisfied:

$$\varphi h - \theta h - \theta h \leq -A\tan((w0+z1)/h1) \leq \varphi h + \theta h + \theta lh \quad \text{(Formula 18)}$$

$$\varphi h - \theta lh \leq A\tan((w8-z1)/h1) \leq \varphi h + \theta h + \theta lh \quad \text{(Formula 19).}$$

11. The movable apparatus according to claim 1, wherein where, in a case in which the movable apparatus is viewed from the side face, an angle in an optical axis direction from a vertical direction is φv, an angle of view of the high-resolution region is θv, an angle of view of the low-resolution region is θlv, a distance between a viewpoint position of a driver and the second installation position is x, a height of the second installation position is h1, a distance from the viewpoint position to a leading end of the movable apparatus is d0, a length of the movable apparatus is d8, a distance from the movable apparatus to a predetermined position on the near side in the rear direction is d10, a distance from the movable apparatus to a predetermined position at a distance in the rear direction is d11, a width of the movable apparatus is w6, a height of a predetermined object in the rear of the movable apparatus is h3, and a distance between the second installation position and a side surface of the movable apparatus is z, the second imaging apparatus is installed so as to satisfy Formulae 24 to 28 below:

$$\varphi v - \theta v - \theta lv \leq \quad \text{(Formula 24)}$$
$$-\text{Atan}((d1 - x2 + d11)/h2) \leq \varphi v + \theta v + \theta lv \quad \text{(When } h2 \geq h3\text{)}$$

$$\varphi v - \theta v - \theta lv \leq \quad \text{(Formula 25)}$$
$$-\text{Atan}((d1 - x2 + d12)/(h2 - h3)) \leq \varphi v + \theta v + \theta lv \quad \text{(When } h2 < h3\text{)}$$

$$\varphi v - \theta v - \theta lv \leq \quad \text{(Formula 26)}$$
$$-\text{Atan}((h3 - h2)/(d1 - x2 + d12)) - 90° \leq \varphi v + \theta v + \theta lv \quad \text{(When } h2 \geq h3\text{)}$$

$$\varphi h - \theta h - \theta lh \leq \quad \text{(Formula 27)}$$
$$\text{Atan}((w0 + z2)/h2 - h3)) \leq \varphi h + \theta h + \theta lh \quad \text{(when } h2 < h3\text{)}$$

$$\varphi h - \theta h - \theta lh \leq \quad \text{(Formula 28)}$$
$$\text{Atan}((h3 - h2)/(w0 + z2)) + 90° \leq \varphi h + \theta h + \theta lh.$$

12. The movable apparatus according to claim 1, comprising: at least one processor or circuit configured to function as an image processing unit configured to combine outputs obtained from the first imaging apparatus and the second imaging apparatus to generate a bird's-eye video image.

13. An image processing apparatus that receives an output from a movable apparatus in which a first imaging apparatus and a second imaging apparatus provided with an optical system for forming an optical image having a low resolution region in the vicinity of an optical axis and a high resolution region outside the low resolution region on a light receiving surface of an imaging element are used, the first imaging apparatus is installed at a first installation position in a front corner portion of the movable apparatus so that the ground in front of the movable apparatus and the ground in a first side of the movable apparatus are imaged, and the second imaging apparatus is installed at a second installation position at a rear corner portion of the movable apparatus, which is on a diagonal corner side of the first imaging apparatus so that the ground in the rear of the movable apparatus and the ground in a second side of the movable apparatus are imaged, the image processing apparatus comprising:

at least one processor or circuit configured to function as an image processing unit configured to combine output obtained from the first imaging apparatus and the second imaging apparatus to generate a bird's-eye video image, wherein where an image height of the optical system is y and θ is a half angle of view, a projection characteristic y(θ) satisfies Formula 1 below:

$$0.2 < 2 * f \tan(\theta \max/2)/y(\theta \max) < 0.92. \quad \text{(Formula 1)}$$

14. A non-transitory computer-readable storage medium storing a computer program for an image processing apparatus that receives an output from a movable apparatus: wherein, in the movable apparatus, a first imaging apparatus and a second imaging apparatus provided with an optical system for forming an optical image having a low resolution region in the vicinity of an optical axis and a high resolution region outside the low resolution region on a light receiving surface of an imaging element are used, the first imaging apparatus is installed at a first installation position in a front corner portion of the movable apparatus so that the ground in front of the movable apparatus and the ground in a first side of the movable apparatus are imaged, and the second imaging apparatus is installed at a second installation position at a rear corner portion of the movable apparatus, which is on a diagonal corner side of the first imaging apparatus so that the ground in the rear of the movable apparatus and the ground in a second side of the movable apparatus are imaged, wherein the computer program comprises instructions for combining output obtained from the first imaging apparatus and the second imaging apparatus to generate a bird's-eye video image, and wherein an image height of the optical system is y and θ is a half angle of view, a projection characteristic y(θ) satisfies Formula 1 below:

$$0.2 < 2 * f \tan(\theta \max/2)/y(\theta \max) < 0.92. \quad \text{(Formula 1)}$$

15. An installation method for an imaging apparatus in which a first imaging apparatus and a second imaging apparatus provided with an optical system for forming an optical image having a low resolution region in the vicinity of an optical axis and a high resolution region outside the low resolution region on a light receiving surface of an imaging element are used, the first imaging apparatus is installed at a first installation position in a front corner portion of the movable apparatus so that the ground in front of the movable apparatus and the ground in a first side of the movable apparatus are imaged, and the second imaging apparatus is installed at a second installation position at a rear corner portion of the movable apparatus, which is on a diagonal corner side of the first imaging apparatus so that the ground in the rear of the movable apparatus and the ground in a second side of the movable apparatus are imaged, and wherein an image height of the optical system is y and θ is a half angle of view, a projection characteristic y(θ) satisfies Formula 1 below:

$$0.2 < 2 * f \tan(\theta \max/2)/y(\theta \max) < 0.92. \quad \text{(Formula 1)}$$

\* \* \* \* \*